US010534853B2

(12) United States Patent
Metcalf et al.

(10) Patent No.: US 10,534,853 B2
(45) Date of Patent: *Jan. 14, 2020

(54) MEDIA FORUMS FOR MANAGING MOBILE GENERATED USER CONTENT AND ASSOCIATIONS TO ARTICLES

(71) Applicant: Oath Inc., New York, NY (US)

(72) Inventors: Michael Metcalf, San Francisco, CA (US); Jaesung Park, San Francisco, CA (US)

(73) Assignee: Oath Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/026,940

(22) Filed: Jul. 3, 2018

(65) Prior Publication Data

US 2018/0314679 A1  Nov. 1, 2018

Related U.S. Application Data

(63) Continuation of application No. 14/076,086, filed on Nov. 8, 2013, now Pat. No. 10,013,402.

(51) Int. Cl.
*G06F 17/22* (2006.01)
(52) U.S. Cl.
CPC .................. *G06F 17/2247* (2013.01)
(58) Field of Classification Search
CPC .................................. G06F 17/2247
USPC ......................................... 715/234
See application file for complete search history.

(56) References Cited

U.S. PATENT DOCUMENTS

| 8,046,237 B1* | 10/2011 | King | G06Q 30/02 705/26.1 |
| 2010/0192055 A1* | 7/2010 | Shaked | G06F 17/30616 715/234 |
| 2013/0254231 A1* | 9/2013 | Decker | G06F 17/30545 707/770 |

OTHER PUBLICATIONS

Gottipati, Swapna, David Lo, and Jing Jiang. "Finding relevant answers in software forums." In Proceedings of the 2011 26th IEEE/ACM International Conference on Automated Software Engineering, pp. 323-332. IEEE Computer Society, 2011. (Year: 2011).*

* cited by examiner

*Primary Examiner* — Frank D Mills
(74) *Attorney, Agent, or Firm* — Cooper Legal Group, LLC

(57) ABSTRACT

Methods, systems and computer readable media are provided for managing user generated content in relation to content. One example method includes receiving content from a mobile device. The received content is associated to one or more entities. The method associates the received content to a media forum. The association of the content to the media forum enables at least one discussion regarding the received content on the media forum. The media forum has an interest graph that adjusts over time. Responsive to receiving a request to view an article, the method selects the media forum to be associated with the article when the article is presented on a display. The association of the media forum to the article provides an adjustment to the interest graph of the media forum.

17 Claims, 26 Drawing Sheets

MFA - Current Prominence Calculation — 200

| | |
|---|---|
| E1 = .8 + .05 + .50 + .2 | = 1.55 |
| E2 = .1 + .6 + .7 | = 1.40 |
| E7 = .1 + .3 + .2 + .05 | = 0.65 |
| E12 = .05 + 0.05 | = 1.0 |
| E13 = .20 | = .20 |
| E75 = .05 | = .05 |

(MFA)

FIG. 4D

Prominence Score of Entities of Media Forum A (MFA) — 220

| Entity | Score |
|---|---|
| E1 | 1.55 |
| E2 | 1.40 |
| E12 | 1.0 |
| E7 | 0.65 |
| E13 | 0.20 |
| E75 | 0.05 |

222 — Entity | 224 — Score | 226 — RANK

FIG. 4E

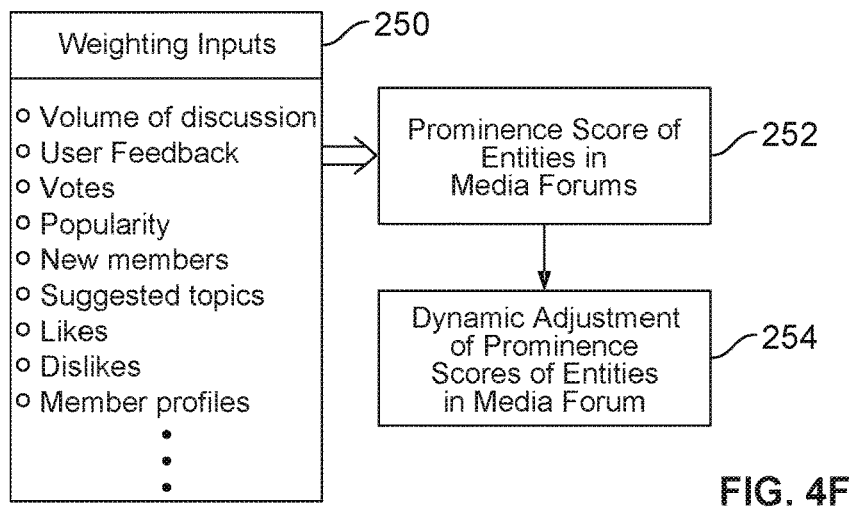

Weighting Inputs — 250
- Volume of discussion
- User Feedback
- Votes
- Popularity
- New members
- Suggested topics
- Likes
- Dislikes
- Member profiles
- ⋮

→ Prominence Score of Entities in Media Forums — 252

→ Dynamic Adjustment of Prominence Scores of Entities in Media Forum — 254

FIG. 4F

Weighting Entity Prominence by Volume of Discussions — 260

262:

| E1 = (.8x5) | E2 = (.6x3) | E1 = (.5x4) | E2 = (.7x2) |
|---|---|---|---|
| E2 = (.1x5) | E7 = (.3x3) | E7 = (.2x4) | E1 = (.2x2) |
| E7 = (.1x5) | E1 = (.05x3) | E13 = (.2x4) | E7 = (.05x2) |
|  | E12 = (.05x3) | E75 = (.1x4) | E12 = (.05x2) |
| (N = 5) | (N = 3) | (N = 4) | (N = 2) |

264:

$E1 = \Sigma (.8x5) + (.05x3) + (.5x4) + (.2x2) = 7.9$ $E2 = \Sigma (.1x5) + (.6x3) = 2.3$ $E7 = \Sigma (.1x5) + (.3x3) + (.2x4) + (.05x2) = 2.3$ $E12 = \Sigma (.05x3) + (0.05x2) = 0.25$ $E13 = \Sigma (.2x4) = 0.80$ $E75 = \Sigma (0.05x2) = 0.1$

FIG. 4G

Weighted Prominence Score of Entities of Media Forum A (MFA) — 220'

| Entity | Score |
|---|---|
| E1 | 7.9 |
| E2 | 2.3 |
| E7 | 2.3 |
| E13 | 0.8 |
| E12 | .25 |
| E75 | 0.1 |

(RANK — 226)

Viking's Forum discussions from elsewhere

Original Discussion: Blah blah blah...

Discussed in Peterson Back to work, with a bit of rest
Viking ready for prime time
Peterson looks forward to challenging rival ← Indicator of where this post has been discussed. Content discovery is facilitated via the forum

[👤] Post a reply

93 Replies      Popular Now    Newest    Oldest    Most Replied

Greg : 6 days ago    △ 350 ▽
Proin in urna a mauris pulvinar tincidunt. Donec in sem in mauris feugiat rutrum ac ac quam. Maecenas ac erat nisl.

Expand Replies (2)  Reply

> Steven : 6 days ago    △ 140 ▽
> Nunc rutrum dui nec eros dapibus, nec gravida urna vulputate. Ut et nisl ante. Aliquam commodo bibendum nisl, ut ornare mi fermentum et.
>
> Expand Replies (9)  Reply

Marc : 6 days ago    △ 80 ▽
Nunc rutrum dui nec eros dapibus, nec gravida urna vulputate. Ut et nisl ante. Aliquam commodo bibendum nisi, ut ornare mi fermentum et.

Expand Replies (9)  Reply  [View more replies]

---

Ponder is ponderous so far this season    △ 568 ▽
Ryan : 1 days ago

Duis non iaculis risus. In scenlerisque neque aliquet erat convallis, quis convallis risus rhoncus...
75 Replies ▽

New stadium plan looks awesome!    △ 527 ▽
Scott : 1 days ago

Duis non iaculis risus. In scenlerisque neque aliquet erat convallis, quis convallis risus rhoncus...
62 Replies ▽

Oras mi velit, pharetra non eleifend ne, viverra vel nisi.    △ 428 ▽
Jonathan : 1 days ago Duis non iaculis risus. In scenlerisque neque aliquet erat convallis, quis convallis risus rhoncus...
59 Replies ▽

Fusce faucibus augue eu quam cursus suscipit pellentesque ultrices.    △ 409 ▽
Richard : 1 days ago Duis non iaculis risus. In scenlerisque neque aliquet erat convallis, quis convallis risus rhoncus...
43 Replies ▽

Nullam eget augue vitae purus dignissim venenatis et eu enim.    △ 384 ▽
ERIC : 1 days ago Duis non iaculis risus. In scenlerisque neque aliquet erat convallis, quis convallis risus rhoncus...
40 Replies ▽

Minnesota Vikings ▼
0-2-0, 4th NFC North

Home   Schedule   Roster   Stats   Transactions   Viking Forum

Scores & Schedules :

Friday, August 9 - (Preseason)
　　　　Houston 27-13 Minnesota　　　　Final

Friday, August 16 - (Preseason)
　　　　Minnesota 16-20 Buffalo　　　　Final

Sunday, August 25 - (Preseason)
　　　　Minnesota 14-34 San Francisco　　　　Final

Thursday, August 29 - (Preseason)
　　　　Tennessee 23-24 Minnesota　　　　Final

Sunday, September 8 - Regular Season Begins
　　　　Minnesota 24-34 Detroit　　　　Final Sunday, September 15
　　　　Minnesota 30-31 Chicago　　　　Final ← Fan Page
Automatically shows the option of a fan forum, which was associated to the fan page content

FIG. 10F

Vikings Fan Forum [Member]
3560 followers

Top  Newest  Oldest

New discussion
Discussion view

→ Discussion View
→ Article View

Will Purple Jesus break the single season record in 2013?  ◁ 600 ▷
Ryan : 1 days ago
Duis non iaculis risus. In scenlerisque neque aliquet erat convallis, quis convallis risus rhoncus...
93 Replies ▽

Ponder is ponderous so far this season  ◁ 568 ▷
Ryan : 1 days ago
Duis non iaculis risus. In scenlerisque neque aliquet erat convallis, quis convallis risus rhoncus...
75 Replies ▽

New stadium plan looks awesome!  ◁ 527 ▷
Scott : 1 days ago
Duis non iaculis risus. In scenlerisque neque aliquet erat convallis, quis convallis risus rhoncus...
62 Replies ▽

Oras mi velit, pharetra non eleifend ne, viverra vel nisi.  ◁ 428 ▷
Jonathan : 1 days ago
Duis non iaculis risus. In scenlerisque neque aliquet erat convallis, quis convallis risus rhoncus...
59 Replies ▽

Fusce faucibus augue eu quam cursus suscipit pellentesque ultrices.  ◁ 409 ▷
Richard : 1 days ago
Duis non iaculis risus. In scenlerisque neque aliquet erat convallis, quis convallis risus rhoncus...
43 Replies ▽

Nullam eget augue vitae purus dignissim venenatis et eu enim.  ◁ 384 ▷
ERIC : 1 days ago
Duis non iaculis risus. In scenlerisque neque aliquet erat convallis, quis convallis risus rhoncus...
40 Replies ▽

---

Most Discussed Topics
This week          Last week
- 1 Minnesota Vikings    1
- 2 Adrian Peterson      2
↑ 3 Metrodome           4
↓ 4 Surly Beer           5
↑ 5 Brett Favre          3

View all

← Most discussed Entities in forum

Topic Picker
In this forum, show me more content about
Minnesota Vikings

[ Yes ]  [ No ]

Suggest topic          Skip

← Topic picker dialog

← Suggest topic (entity)

FIG. 10G

MEDIA FORUMS FOR MANAGING MOBILE GENERATED USER CONTENT AND ASSOCIATIONS TO ARTICLES

CLAIM OF PRIORITY

The present application is a continuation of U.S. patent application Ser. No. 14/076,086, filed on Nov. 8, 2013, entitled "Media Forums for Managing Mobile Generated User Content and Associations to Articles," which is incorporated herein by reference in its entirety.

CROSS REFERENCE TO RELATED APPLICATION

This Application is related to U.S. patent application Ser. No. 14/076,082 (since patented as U.S. Pat. No. 9,858,249), filed on Nov. 8, 2013, entitled "Media Forums for Presenting and Managing User Generated Content Regarding Articles Presented on Websites", which is herein incorporated by reference.

BACKGROUND

1. Field of the Invention

The present invention relates to user generated content that is associated with content presented on websites.

2. Description of the Related Art

Over the years, the Internet has continued to provide users with access to content of all types, and via multiple devices. As users consume such content via websites, user sometimes participates by supplying comments regarding content viewed. The comments often times relate to the content that was viewed and other times, relate to the user's own views regarding other content. As a result, comment listings on websites will generally include a disparate collection of comments, many of which may or may not relate to the content. Even when comments relate to the content, the comments provided by users may have different agendas or a different topic focus. Unfortunately, such unorganized collection of comments may sway users away from participating with their comments. Further, current comment collecting systems tie the comments only to the particular content being commented on, and once that content becomes less recent or loses freshness, the comments will also disappear along with the content.

It is in this context that embodiments of the invention arise.

SUMMARY

Broadly speaking, embodiments of the present invention provide methods and systems for generating, presenting, and receiving comments from users regarding content that is presented on websites, which can include mobile device sites (e.g., apps) and non-mobile sites and services. Examples include presentation of media forums that include discussions threads regarding articles, wherein media forums have an associated interest graph that can change based on user interaction in the media forum and based on where the media forum is originating discussion thread activity. Media forums are, in one embodiment, configured for automatic surfacing or association to content in relation to articles or content viewed or read by users. Several inventive embodiments of the present invention are described below.

Methods, systems and computer readable media are provided for managing user generated content in relation to content. One example method includes receiving content from a mobile device. The received content is associated to one or more entities. The method associates the received content to a media forum. The association of the content to the media forum enabling at least one discussion regarding the received content on the media forum. The media forum having an interest graph that adjusts over time. Responsive to receiving a request to view an article, the method selects the media forum to be associated with the article when the article is presented on a display, the association of the media forum to the article provides an adjustment to the interest graph of the media forum.

In one embodiment, a method includes receiving a request to access an article having descriptive content that includes one or more entities. Each entity in the article has an assigned prominence score, and the request is received from a website in response to user selection of the article. The method further includes identifying one or more media forums to relate to the article. Each media forum includes one or more discussion threads, and each media forum is associated with an interest graph that changes over time. Responsive to the request, the method selects a media forum from e one or more media forums to associate with the article based on examination of the interest graph of the media forum and the assigned prominence scores of entities in the article. The method presents the article on the website, wherein the presentation of the article includes additionally presenting the identified media forum in association with the article.

In another embodiment, a system for managing user generated comments made in association with articles is provided. The system includes memory for storing program instructions and data and a processor for executing the program instructions. The program instruction, when executed receives a request to access an article having descriptive content that includes one or more entities. Each entity in the article has an assigned prominence score, and the request is received from a website in response to user selection of the article. The system will identify one or more media forums to relate to the article, and each media forum includes one or more discussion threads and each media forum being associated with an interest graph that changes over time. The system, responsive to the request, selects a media forum from the one or more media forums to associate with the article based on examination of the interest graph of the media forum and the assigned prominence scores of entities in the article. The system presents the article on the website, and the presentation of the article includes additionally presenting the identified media forum in association with the article.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

FIG. 4D illustrates an example where the prominence scores of the entities are tabulated in a table, in accordance with an embodiment of the invention.

FIG. 4E illustrates an example scoring table, in accordance with an embodiment of the invention.

FIG. 4F illustrates an example where the ranking of the entities for the media forum can be adjusted by any number of weighting inputs or methods, in accordance with an embodiment of the invention.

FIG. 4G illustrates an example where the entities in a media forum are collected over time and adjusted over time based on their association to specific articles having entities with specific entity prominence scores, in accordance with an embodiment of the invention.

FIG. 4H illustrates an example scoring table, after one type of weighing is applied, in accordance with an embodiment of the invention.

FIGS. 4I and 4J illustrate example screenshots of a media forum, which in this case is a media forum for the Minnesota Vikings, labeled "Vikings fan forum", in accordance with an embodiment of the invention.

FIGS. 10A through 10J illustrate examples of a media forum utilized in the context of sporting articles, in accordance with several embodiment of the invention.

DETAILED DESCRIPTION

Figure 1A:
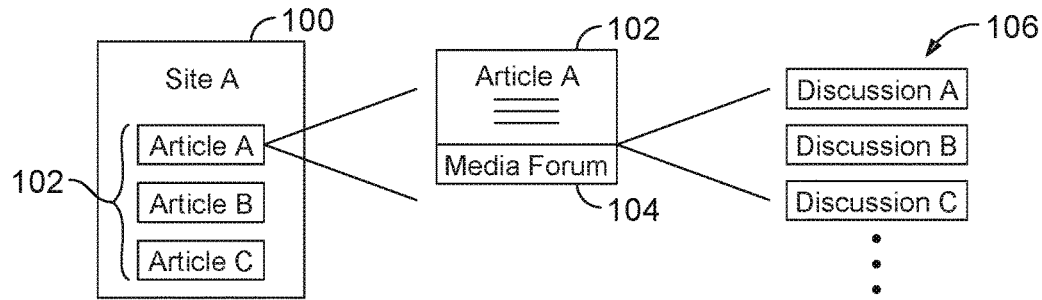
FIGS. 1A and 1B illustrate example websites and logic for associating and presenting media forums in relation to articles, in accordance with an embodiment of the invention.

The following embodiments describe systems and methods for generating, presenting, receiving and managing comments and feedback from users regarding content presented on websites. Examples include presentation of content in the form of media forums that include discussions threads regarding articles, and the media forums are configured for association to various articles having entity content that relate to the media forum. It will be obvious, however, to one skilled in the art, that the present invention may be practiced without some or all of these specific details. In other instances, well known process operations have not been described in detail in order not to unnecessarily obscure the present invention.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In one embodiment, media forums are a place where users can gather online to discuss their shared passions and interests. In one example, each media forum has its own distinct interest graph that is partially or fully automated, and at least partially determined by the explicit actions of its members or users. Because each forum has its own interest graph, forums are able to intelligently appear in lieu of unstructured comments at the bottom (or any other location) of an article displayed at a website, in response to a user request to view the article. The appropriate forums appear automatically with the content whose topics match the interests of the forum. The collective brain, e.g., interest graph, of the forum provides seamless interaction between long-lasting discussions and content. For example, a media forum may be associated with one or more articles, and comments made in the media forum when associated with specific articles can be viewed by users who are commenting in the media forum after accessing another article or the same article or content.

By way of this interaction, the media forum can surface articles and comments to interested users regarding the entities discussed in the forum and articles. As interaction with the media forum proceeds, the interest graph of each media forum will change and modify to expose both comments and articles related to the entities that are of interest to users. In one implementation, users who are members of select media forums will be provided with presentation of the media forum or links to the media forum when the user is viewing content/articles that include entities that are associated with the media forum. In this manner, media forums are able to follow users as users consume content/articles, and participating in the media forum will further expose content commented on by others who are members of the media forum or comment in the media forum as guests (e.g., non-members).

As noted above, some embodiments provide for automated forum discovery in context, wherein forums appear automatically on or in relation to the content or article. Thus, forums go to the user, which reduces the need for users to seek out specific forums and/or avoids the necessity of a user to remember to visit a forum. In general, forums assist in promoting expanded participation regarding topics that users want to read and provide comments for. In one implementation, forums help solve the issue of multiple voices/communication styles that get thrown together in cacophony as is common in comment lists that are surfaced at the end of articles or content. For example, while more vocal liberals and conservatives spar on news articles about the President of the United States, moderates might sit on the sidelines. One example may be to define a "Political Moderates" media forum that expands participation. This system is more inviting for users to participate because they find likeminded people in media forums.

Media forums also encourage sustained discussions, which funnel comments into re-purposed content. Just like any individual user, media forums have an interest graph that changes or adjusts based on the interests of the members of that media forum. Interest-based forum enables automatic delivery of content to the forum, and additionally, the forum to the content (e.g., forums associated to articles or content consumed by individuals). In one example, instead of general comments below an article about a recent National Football League (NFL) football game between the Vikings and Packers, the system will present a "Vikings Fan Forum" and/or a "Packers Fan Forum."

In one embodiment, various methods are used to decide which media forum to present to a user. For example, if a user is a member of one media forum, that user will likely be presented the forum for which he is a member over others. Other signals can be used to determine which media forum to present when close options are found, such as a user's location, user's IP address, recent activity by a user in different forums, the content of comments, social media friends of a user, the user's profile, the user's interest graph, or combinations thereof. Other factors and methods for selecting media forums for users will be described below.

In one embodiment, conversations live in the forum, not the article. So unlike traditional comments, each forum may travel freely between articles and extends the life of a vibrant conversation. In one example, once a user joins a forum as member, the media forum will come to the user. In one implementation, the media forum may automatically attach itself to the content that matches the entities of the media forum. By giving users access to the forum in the context of media, user participation regarding content is improved and also provides a way for users to find new and related content and conversations.

In one embodiment, the method defines a topic picker for a media forum. A topic, in one implementation, is an entity. For example, media forums can also be visited on dedicated pages, instead of only being accessible as appended or related to content. The dedicated page or pages may be referred to as forum landing pages. On a forum landing page, a user or member may access a topic picker module, where members are encouraged to vote on the topics/entities they want to see more of in their media forum. This is one type of user feedback that will assist in dynamically adjusting the interest graph of the media forum. Thus, a group's ability to vote for topics ensures that the forum stays relevant to the users' collective interests. For a football type media forum, an event might happen when a player on a team changes teams. This event will reduce the prominence of the player entity in the media forum (e.g., will reduce the prominence score of the entity, the entity being the player).

Further, via member-led topic submissions, users are able to rapidly shift both the conversations that are most important in the media forum and the content that is delivered to the media forum. In addition, when a user submits a new topics/entity to the forum, the forum automatically shows up in the context of articles about those topics, expanding exposure of the forum to new users, and the user base of the Forum. In still another example, member-submitted URLs enable integration or association to small sites or blogs that usually go unnoticed and are difficult to rank. For one implementation, users in a content-specific media forum are able to associate URLs to the interest graph of the forum. In one embodiment, the legitimacy of user suggested URLs or media sources can be voted up or down by members of the media forums.

One feature is that instead of remembering to visit a media forum, the media forum finds the user in the context of the media the user wishes to consume. When a user joins a media forum, the media forum may follow the user around a content network, e.g., such as various vertical property sites of a website such as Yahoo! Inc. or others (e.g., each of which have various articles or content). In one specific example, a Flickr (e.g., a photo sharing site) user who may be at the Vikings training camp might decide to share a photo of Adrian Peterson with a Vikings Fan Forum (e.g., FIG. 10J below). In another example, as Yahoo! introduces forums automatically based on the content of the article, the system also enables users to discover other like-minded people with whom the user might want to discuss content. The various implementations can assist in making media personalization more effective, informative regarding the relationship between entities, and can also provide a system to contribute photos via mobile, and/or start bringing together interaction between different content sites.

In still another embodiment, a type of media forum can be comments or contributions made to a site that provides answers to questions. For example, if someone posts a question to a site or page, other users can attempt to answer the question. The answers can then be voted on by community users. In one embodiment, the questions and/or answers can be defined as a discussion or comment. Thus, media forums can include question/answer entries, and the answers can be voted up/down to impact entities described in the answers or questions.

FIG. 1A illustrates an example website, Site A 100, which includes content. The content, in one embodiment, may be a description, story, news, illustrations, summary, pictures, videos, text, or combinations thereof. The content, in one embodiment, may be defined by an article or multiple articles (e.g., Articles A-C) 102. The articles may be displayed in Site A 100 along with a short summary, title, image or caption. Users wishing to read more about the articles would be allowed to click on a link, touch a link or open an expanded view of the article. In some embodiments, the articles may be fully presented (i.e., open) upon entering the site. For instance, some sites present one or more articles in full view mode, without the need to open the article or without displaying a short title or summary Therefore, in either presentation form, the article, when presented will include content, such as the above mentioned text, images, links, pictures, videos, or combinations of one or more thereof.

In the example of FIG. 1A, the Article A is presented on the website upon receiving the request from the user to view or select the article. The content of the article can then be viewed by a user. If the article extends longer than the screen of the display device, the user can scroll or move the display area in a stream or thread format until the user finishes viewing or reading the article. In one embodiment, the article will have an end region. The end region is the area on the webpage where the article ends. The end region may, in some embodiments, include a transition to another section or region. The other region may include other related text, links, advertisements, or user interfaces to enable users to comment and view comments regarding the Article A and other related articles.

In one embodiment, instead of presenting an interface that receives and displays comments that are only tied to Article A, a media forum 104 is associated to Article A 102. A media forum 104, as described above, will include one or more discussions 106. The discussions presented in the media forum 104 may relate to Article A, but more particularly, the discussions are configured to relate to the content of Article A.

As mentioned above, the content of Article A can vary to include any type of content, such as sports stories, news stories, commentary, movie reviews, product/service descriptions, short stories, scientific stories, current events, geographic descriptions, stories or articles related to individuals, places, things, events, images and stores, videos and stores, text only, or combinations of any type of description or text that can be displayed on a website and viewed or read on any type of device. Given that the content of Article A can vary to include any type of content that can be viewed or read on a website (and any mobile app), analysis of the content of Article A is performed to identify any text, images, videos, or metadata that mentioned or includes an entity.

As used herein, an entity is a word or group of words that describe a person, place or thing or any other object or subject related to a topic or topics mentioned in the article. As an example, if Article A is a story regarding a recent football game, the Article will include a number of entities. The entities may include the name of the football teams that played, the names of key players for each team, the location where the game was played, significant plays that occurred during the game, names of coaches, names of commentators, names of referees, names of past players, scores, regional facts of where the game was played, things related to the game, and a variety of nouns used in Article A. In one embodiment, an entity can be descriptive of a topic or topics of Article A. In still other embodiments, an entity can be defined similarly to how words are associated to Wikipedia IDs. For the Wikipedia ID example, Wikipedia IDs are derived from the sub-domains of topics that appear in Wikipedia. Content found in a Wikipedia entry or page is typically a collection of contributions from various people that visit, have an interest in the topics, or maintain or manage the topic or topic pages. For example, the entity "platypus" can be derived from the URL http://en.wikipedia.org/wiki/Platypus. Wikipedia IDs represent the disambiguated topics and interests that are deemed by contributors to be worth defining. In general, and for purposes of clarity and to convey one example, entities in an article can be viewed as, without limitation, text, and more generically a word or words that relate to a topic or noun used in a particular article.

In one implementation, the Article A 102 can be processed to identify the entities mentioned or included in the article. The processing can identify a set of entities and the set of entities can be scored. The scoring can be performed to identify which of the entities is most prominent in Article A. For example, if a particular word or group of words that define an entity is used more often than others in Article A, that entity may be given a higher prominence score relative to other entities in the article. If a particular entity is used in a particular context or grammatical form that infers higher significance or importance to the article (even if not used often), that entity may be given a higher prominence score relative to other entities. If an entity is used in a title of the article, that entity may be given a higher prominence score relative to others.

In one embodiment, the scoring of entities in an article will include reference to logic and rules that are used to decide how to score particular entities in the article for prominence. The rules can be predefined rules that are applied during automated processing of the article or articles. The logic refers to the rules and assigns the prominence score to the various entities found in the article. In one embodiment, if certain entities receive very low scores, the system may discount that entity as not having significance to the article. In some embodiments, a top subset of entities in the article can be assigned a score. For example, the score can be defined in various numerical ways, but for purposes of example, scores can be assigned values between zero (0) and one (1).

An entity having a higher prominence score may have a score closer to one, while an entity having a low prominence score may have a score closer to zero. Therefore, in one embodiment, articles are pre-processed to identify entities and grade the entities with assigned prominence scores. The entities of an article may be referred to as an entity set. In one embodiment, articles can be processed to identify entities and score entities in accordance with processes referred to as contextual analysis platform (CAP) processing. CAP processing has been used in internet search technology to identify contextually relevant data, such as entities in web pages, and such processing can be similarly performed for individual articles, which may be presented in webpages. Various other processes for identifying and ranking entities are described, as an example, in U.S. Pat. Nos. 7,958,115, 7,962,465, and 8,073,877. Each above-identified patent is herein incorporated by reference.

Continuing with the discussion of FIG. 1A, the media forum 104 may also include discussions regarding entities. In one example, a media forum 104 may be initially defined or made for a particular entity. The particular entity may be referred to as an anchor entity. The anchor entity may be the topic of the media forum. With reference to the football example noted above, the media forum may relate to the Minnesota Vikings football team. The anchor entity may therefore be "Minnesota Vikings". Discussions threads in the media forum 104 may therefore include various comments discussing topics related to the Minnesota Vikings. Additionally entities mentioned in the media forum 104 may include player names, stadium names, announcer names, local facts, things related to the football team, etc.

In one embodiment, the media forum 104 may be associated to the article 102 because a threshold overlap exists between the entities discussed in the discussions and threads of the media forum 104 and the article 102. In other embodiments, the media forum 104 is associated to the article 102 because the user viewing the article A is a member of a media forum 104 that relates to the Minnesota Vikings and the article A includes entities that are contained in the media forum 104. In one implementation, the media forum 104, once associated to the article A, can also accept comments from users. The comments can be accepted with the user as a member of the media forum 104 or as a guest.

Comments or discussions added to the media forum 104, when the media forum 104 was associated to article 102, will be assigned entity prominence scores of the associated article 102. Additionally, comments added to existing discussions or comments added to start new discussions, or feedback provided by voting in the media forum 104, are provided to the media forum 104 along with a weighting obtained based on the prominence scores of the entities found in Article A 102. This weighting to comments or discussions will also occur for the media forum 104 when it is associated to other articles.

For example, if other articles contain entities that relate to the entities in the media forum 104, the media forum 104 can then be associated to other articles in the same way as it was associated to article 102. In this manner, users of the media forum 104 can view comments that relate to the entities (e.g., or topics) that they are most interested in, not just comments tied to a single article. In one implementation, this is possible because the media forum 104, when associated to other articles will obtain comments from views of those other articles. A user of the media forum will therefore be able to view comments originating in the currently viewed Article A, but also comments that originated in other articles that also included entities that relate to the entities of Article A.

As noted above, a media forum can also be visited at its own media landing page. The media landing page allows for display of the media forum without requiring the media landing page to be initially shown with an article.

Figure 1B:
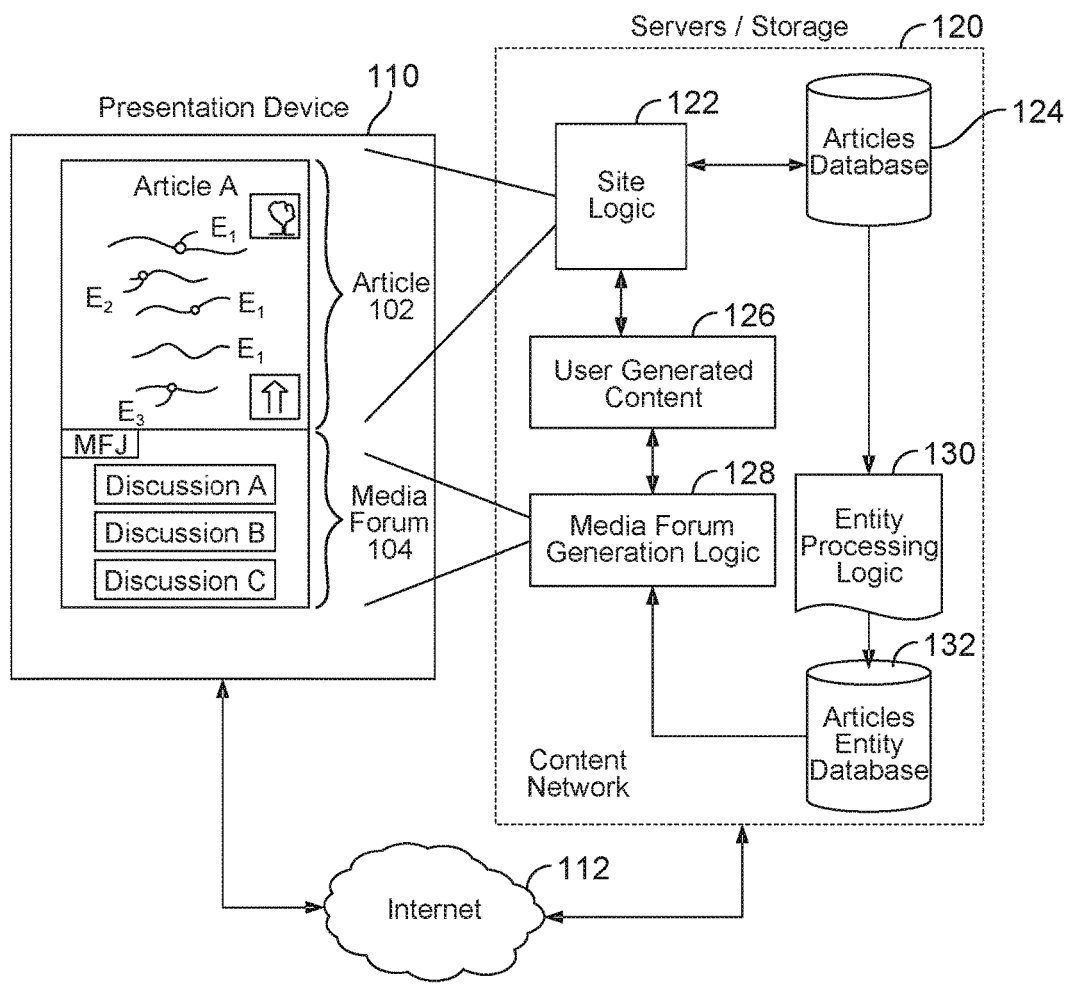

FIG. 1B illustrates an example of a system where a presentation device 110 is in communication with the Internet 112 to servers and storage 120 of a website or websites. In one embodiment, the presentation device 110 can be any device having a display screen and capable of obtaining access to the Internet 112. The device can be a desktop computer, a laptop computer, a tablet computer, a portable device, a smartphone, glasses, and in general any computing device having a processor and memory. The screen of the presentation device 110 may display a webpage from a website 100, or app or mobile app, or a service.

In this example, an article 102 is shown including text, or images, or video, or combination thereof. In other embodiments, article 102 can include only one type of content or several types of content, depending on the formatting, presentation, and arrangement defined by the creator, owner, or service that presents the content. The article 102, for purposes of illustration, includes one or more entities "E" (e.g., E1, E2, E3, etc.). A media forum 104 includes one or more discussions. Each discussion can include multiple comment entries, and each comment entry can be part of a thread in each discussion. For illustration purposes, the media forum 104 associated to article 102 is shown to be media forum J (MFJ).

In one embodiment, site logic 122 interfaces with articles database 124. Articles database 124 is used by the site logic to present articles to users that wish to view or read an article on the website. In one embodiment, the articles database 124 acts as a repository to hold the various articles that are displayable on a website or multiple websites. In some embodiments, the article database 124 can be defined by multiple databases that are distributed or stored in various locations and updated as new content is added or removed. Entity processing logic 130, in one embodiment, is configured to process the articles found in article database 124. The processing of articles by entity processing logic 130 includes, as mentioned above, identifying entities in the articles and assigning a prominence score to the various entities.

The entities found in each article represent a set of entities for an article, and in one embodiment, the entities can be ranked as more prominent than others based on their assigned scores. The processed articles in articles database 124 can be stored in an articles entity database 132. The storing of the processed articles can include the entire article and associated entities and prominence scores, or can simply include a reference to the article and storage of the entities and their associated or assigned prominence scores. In this manner, the entire article does not need to be stored in articles entity database 132, and only relationship between the entities in specific articles is made to the specific articles stored in articles database 124. In one embodiment, media forum generation logic 128 is in processing communication with user generated content 126.

Additionally, media forum generation logic 128 is in communication with the articles entity database 132. The media forum generation logic 128 can also synchronize with site logic 122 so as to enable integration of media forums or links to media forums with specific articles presented by site logic 122. The user generated content 126, in one embodiment, may be the specific comments added by users to the media forum 104. The user generated content can also include the addition of discussions for the media forum, feedback in the form of votes regarding specific postings of comments or discussions, and any other user generated feedback or input associated with the specific media forum 104. The user generated content 126 can be, in one embodiment stored in a database. The media forum generation logic 128 can therefore access the database that stores the user generated content 126 and associated site logic 128 for integration with specific articles.

The media forum generation logic 128 can also access formatting rules, formatting content, organization content, communication modules, and other presentation arrangement and management logic for rendering a media forum 104. As noted above, the media forum generation logic 128 can also manage media forums separate from presentation along with an article. For example, the media forum generation logic 128 can also present media forums on their own specific landing page, which would allow users to comment regarding the topics and entities recited in the specific media forums. The media forum generation logic 128 will also have logic to determine when users accessing specific articles are members of specific media forums. By having users join or become members of a forum, the media generation logic 128 can select or perform tiebreaking determinations when more than one media forum could be associated with a specific article being viewed by a user.

Figure 2:
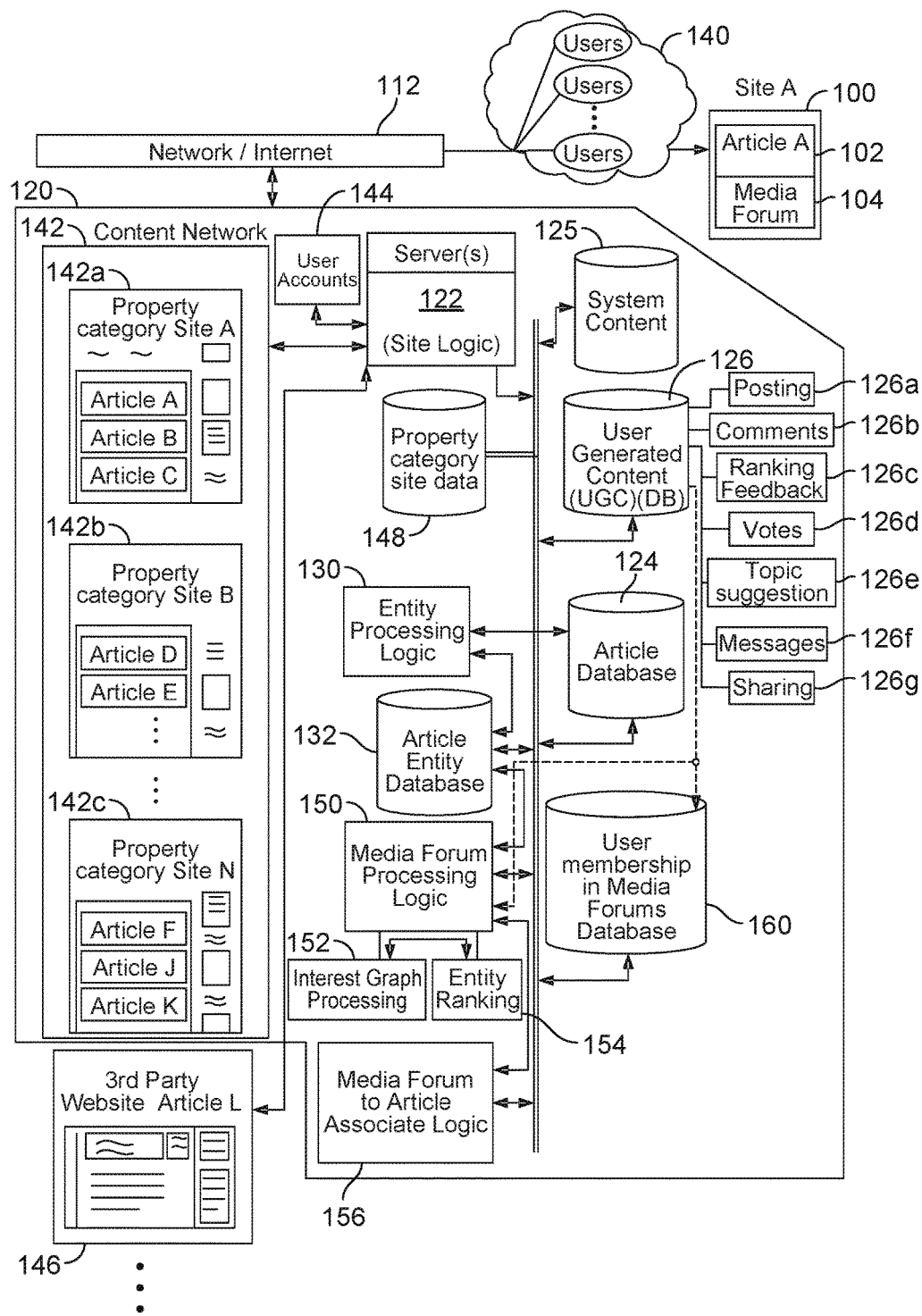
FIG. 2 illustrates a system diagram, which is exemplary of a possible system that provides access to articles and can associate media forums that intelligently change over time for integration with or presentation with articles on a website, in accordance with an embodiment of the invention.

FIG. 2 illustrates a system diagram, which is exemplary of a possible system that provides access to articles and can associate media forums that intelligently and dynamically change over time for integration with or presentation with articles on a website. As shown, users 140 can access a network or the Internet 112 to access a content providing service 120. The content providing service 120 will include servers and storage that process logic to allow presentation of content to users that visit websites of the service. The website of the service can include content of various types. The various types of content can be associated with specific sub websites that display and provide access to content related to the specific content.

As shown, content network 142 includes a plurality of property category sites A-N, which may provide content including access to articles that relate to those specific property category sites. The number of property category sites is sometimes referred to as a vertical, as the content that relates to that specific property category site may be associated with the same focus of the property.

The focus of the property can be for example, to provide information and content related to news, information and content related to finance, information and content related to sports, information and content related to weather, information and content related to games, information and content related to photographs, information and content related to travel, information and content related to social media, information and content related to jobs, information and content related to mail, information and content related to groups, information and content related to mobile, information and content related to dating, etc. Also, each of these properties can include a specific landing page that provides an overview related to the content of the property. In addition, the content can include a listing or a stream that displays a plurality of articles. An article can be a description regarding a person place or thing related to the content, or any other topic related to the content or that may be tangentially or contextually related to the content. Each of the articles in the properties 142a-142c can be selected by a user, which is a request by a user to view the article.

In some embodiments, the article will already be opened or expanded for viewing. In some embodiments, the article will include a title or description that is a link or button that allows a user to open the article to view or read more information regarding the article. If the articles are organized in a stream, the stream of articles can be viewed or scrolled by navigating up and down or side-to-side through the various titles associated with articles.

As noted above, service 120 can also include management of user accounts 144. User accounts 144 enable users to be registered with the service 120 and allow the service 120 to provide more customized content to the user. A user can login to a user account by way of credentials, such as user name and password. Once the user is logged in, the user can navigate the various properties 142 of the service 120. Users can also navigate the content of the properties 142 using service 120 when users are not logged in. However, for logged in users the content provided by the service will be better focused to the likes and dislikes or preferences of the registered user.

Servers 122 will include site logic that enable the presentation of the content on the property category sites and also provide access to user accounts 144. The servers 122, containing site logic will also be in communication with various sub-modules and storage. For ease of description, the communication between the various modules and storage and the site logic 122 is illustrated by way of a bus that allows data, signals, requests, messages, etc., to be communicated throughout the service 120 so that content can be served to the various users 140 accessing service 120. However, the bus may not be physical, but generally represent logical communication or interfacing.

In one embodiment, property category site data 148 can be stored in a database accessible by server logic 122 for presentation of articles in the various property category sites 142. Articles presented in one property category site can also be presented in other category sites, depending on the relevance or context of the article. For example, one article related to news can also be related to sports, and so on.

Articles database 124 is also in communication with site logic 122 as well as user generated content (UGC) databases and logic 126. System content 125 is also provided for defining presentation, management, organization, and servicing of content to the property category sites 142. The user generated content database 126 can also be configured to receive or store data related postings 126a, comments 126b, ranking feedback 126c, voting data 126d, topic suggestion data 126e, messages 126f, sharing data 126g, and other types of data, feedback, selections, input, comments, annotations, and social media interactions provided by users or friends of users can also be stored or associated to the user generated content database 126.

As shown, entity processing logic 130, mentioned above, is in communication with and articles database 124. The entity processing logic 130 is configured to process articles in the articles database 124 and store article entity data in a database 132. The entity stored in article entity database 132 can include, for example, the entities identified in the specific articles, associated prominence scores for each entity in each or some articles, and associations, pointers, or references to the articles in articles database 124.

By processing the articles stored in articles database 124, it is possible to quickly analyze the entities associated with each article by referring to the article entity database 132 upon demand, without having to process an article each time the article is requested for viewing by a user on a site. Media forum processing logic 150 is also provided, which is interfaced with user membership in media forums database 160. As noted above, users may join and become members of specific media forums. The media forums will therefore associate the users that have joined specific media forums so that presentation of certain media forums takes precedent over others. Also shown is communication between the user generated content database 126 and the user membership in media forums database 160, which tracks any user comments made while users are members.

The media for processing logic is also capable of interfacing with the user generated content, which could include a number of comments made in specific discussion threads that are managed in each specific forum. In one embodiment, the media processing logic 150 is also in communication with an interest graph processing 152 and an entity ranking 154. Interest graph processing 152 manages the processing of the interest graph for specific media forums. At specific media forums, received comments from users when forums are attached or associated with different articles, the interest graph in the media forum will change, which will cause certain entities associated with the media forum to change in importance, significance, strength, and/or prominence.

Accordingly, entities in the media forum can be ranked 154 continuously as the interest change in the media forum, based on the significance or prominence of specific entities in articles being viewed when media forums are associated with those articles.

Also shown is media forum to article association logic 156. The media forum to an article association logic 156 is configured to communicate with media forum processing logic 150, the interest graph processing 152, the entity ranking 154, the membership in media forums 160, and the article entity database 132. When users select to view a specific article, the media forum to article association logic 156 will utilize signals from the entities in the articles themselves, which will have entity prominence scores associated therewith. Additionally, the media to forum article associate logic 156 will analyze the interest graph associated with the different media forums available for associating to the article The media forum to associate logic 156 will also reference the user membership in media forums database 160 to determine or prioritize association of specific media forums to specific users, when users are members. The user's interest graph may also be analyzed. For example, when a user 140 visits site 100, an article 102 is presented and a media forum 104 is associated to the article 102. The association of the media forum 104 to article 102 can be by way of displaying content below the article 102. In another embodiment, the media forum content can be displayed beside the article, or inside the article in a frame (e.g., iframe), or in different locations when the article is being displayed. Accordingly, the illustration of having a media forum 104 upended or disposed below and article is only one example.

In other examples, the media forum will not be shown in an open format below an article, but only a link to the media forum will be provided. In still another embodiment, if other media forums have a close association to the article, alternate media forums can also be provided by links to allow the user to select an alternate media forum. In still another embodiment, a drop-down menu can be provided with a selection of other media forums that the user may wish to associate with an article. For instance, if the user is viewing a sports article regarding football teams, and the user is not interested in one of the football teams, the user can be provided with the option of selecting an alternate football team. If the user is not interested in commenting on the media forum related to one of the specific football teams, but instead is interested in commenting about a specific person (e.g., entity) mentioned in the article, the user can also be provided with the option of selecting a media forum regarding the specific person.

Still further, the user can be provided with an option to add or create a new media forum for a specific entity. In general, media forums will have a central or anchor entity that the media forum will relate, and other entities in the media forum will be sub entities to the anchor entity. The sub entities can be prioritized based on their prominence score in the media forum over time, as the interests change in the forum by the users commenting in the discussions of the media forum, or by the users providing feedback or other user generated content or input.

Figure 3:
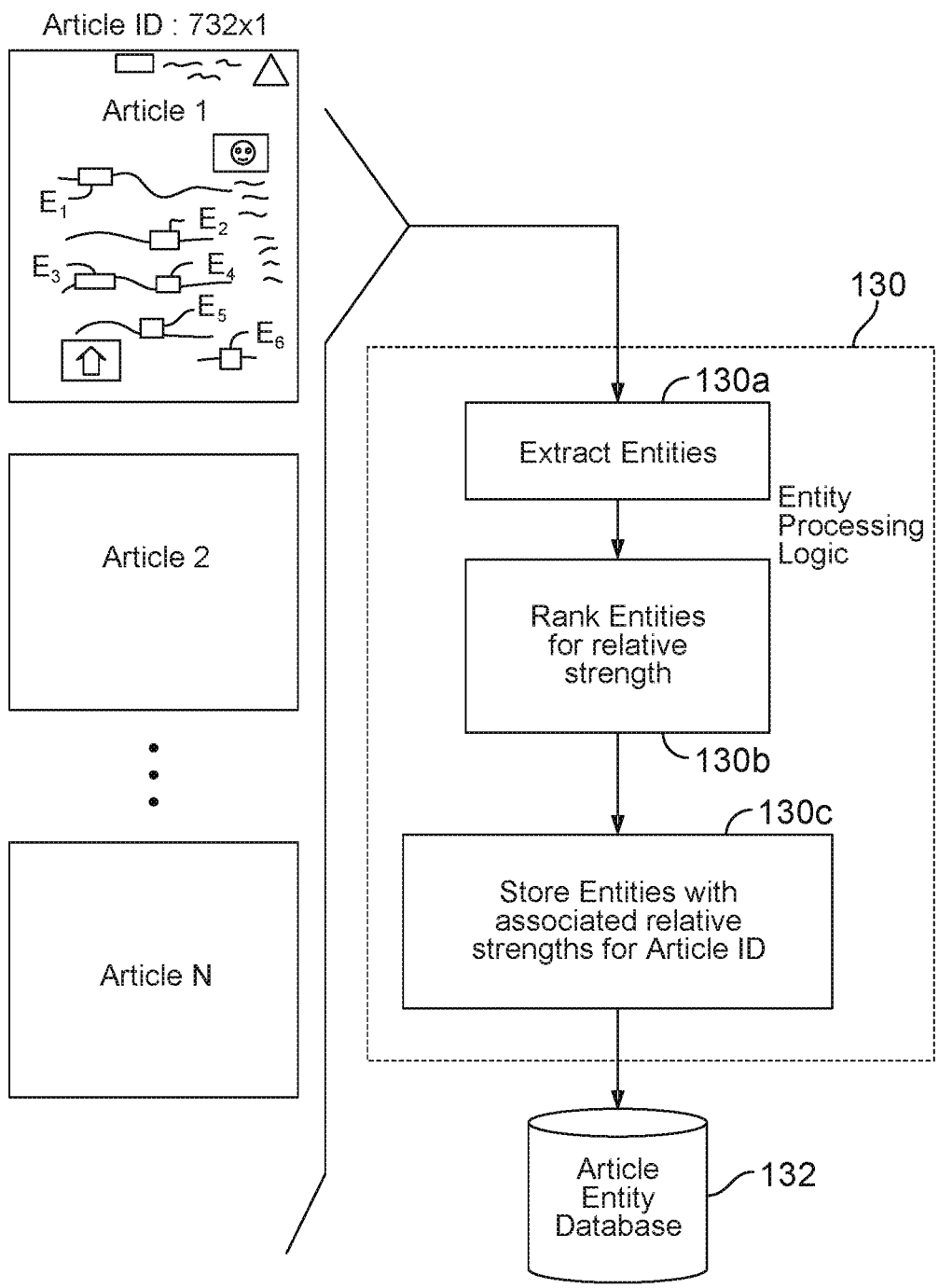
FIG. 3 illustrates an example of the processing performed by entity processing logic, in accordance with an embodiment of the invention.

FIG. 3 illustrates an example of the processing performed by entity processing logic 130. This processing is by way of example only, and additional or different processing can also be performed in order to identify, extract, and rank the various entities in an article. For example, an article can be assigned an ID. The ID can have any form or format, so long as the ID can identify the article for retrieval, selection, storage, and handling. The article, as noted above, can include a number of entities recited in the article. In this example, entities E1, E2, E3, E4, E5, and E6 are shown.

The entities can also be associated with images, videos, and any type of content present in the article or metadata about associated to the article. Still further, the article itself can be a document, a file, a marked up document, encrypted document, or any type of document or content that can be presented, or can hold content that would include one or more entities. The entities, as noted above, can include content such as persons, places, things, groups, or any word, letter, groups of words, etc. In this example, the entity processing logic 130 functions to extract or identify the entities 130a from an article. The extraction or identification of entities can include a search and scan of all words or content, or collection of words or phrases stored or associated with article.

The entities, once identified, can be ranked to identify the relative strength 130b. The relative strength of the entities can be associated with a prominence score. Once the prominence scores are assigned or associated to the various entities in the article, the entities with associated relative strengths for the article are stored 130c. The article entity database 132 will therefore store at least the prominence scores of the various entities in the article. In some embodiments, entities having a low prominence score or insignificant prominence score may not be stored or associate to the article. In some embodiments all of the entities in the article are stored. In some embodiments a threshold of prominence may be required in order to associate the entities to a prominence score and associated to the article.

Figure 4A:
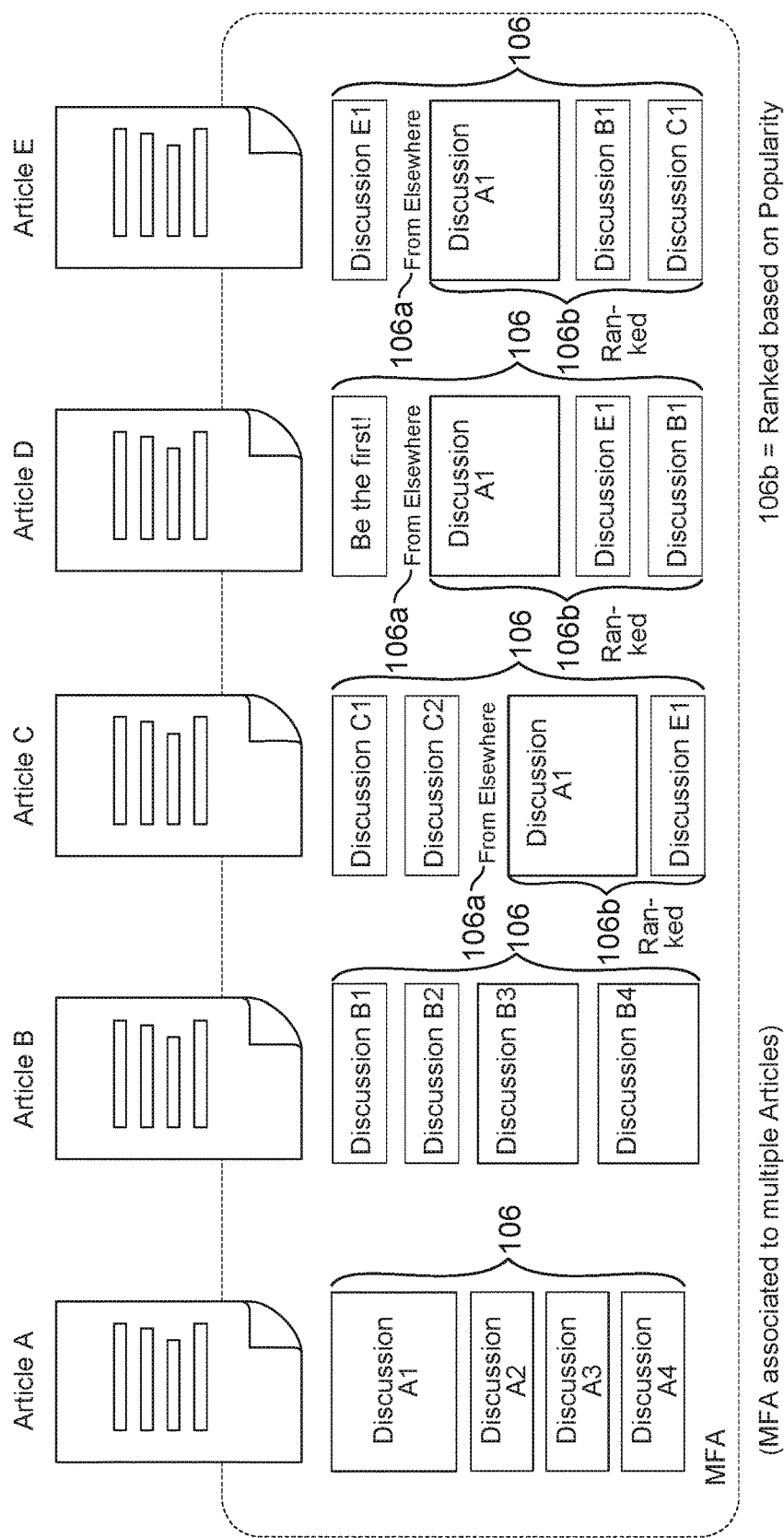
FIG. 4A illustrates an example of a media forum A (MFA), having been associated to articles A-E, in accordance with an embodiment of the invention.

FIG. 4A illustrates an example of a media forum A (MFA), having been associated to articles A-E. For purposes of example, the association of the media forum A to the various articles can occur simultaneously or at different times when the media forum is associated with a specific article in response to a user's request to access an article. Therefore, the illustration of FIG. 4A does not mean that the requirement exists that all articles must be attached or associated to the media forum at one time. Instead, the illustration is meant to convey that the media forum A has been associated to articles A-E, and when the association was present, discussions were provided by users viewing or accessing the respective articles.

When a user is viewing a specific article, the user can participate in the media forum by accessing the media forum and adding comments to an existing discussion 106, introducing the new discussion, providing feedback such as votes, introducing new topics, etc. In the example of articles A and B, the discussions were added when the media forum was associated with the same respective articles A and B. In the case of article C, the first two discussions are associated to article C (e.g., originated in response to an association to article C). However, when the user that accessed article C views the media forum, the user is also provided with discussions from other users that may have commented in the media forum when the media forum was associated with other articles.

For instance, an indicator 106a can be provided to the viewer of article C, indicating that the following discussions originated from the view or association with another article (e.g. discussions from article A and article E). In one embodiment, the discussions provided from elsewhere can be ranked 106b in accordance to popularity. For instance, if the discussions in A1 were much more comprehensive or lengthy in terms of the number of comments, that discussion can be provided first before the discussion E1. The same can be said for the discussions provided from elsewhere which are shown when a user views the media forum after accessing articles D and E.

In one implementation, each article will have its own set of entities which may be associated with a prominence score. The entities in an article are ranked in accordance with the assigned scores. The discussions and comments in the media forum are given a weighting based on the prominence scores of the entities in the article presented when the comments are added to discussions. For example, if a lot of discussions are added to an article having entities with low prominence scores, the entities of the media forum will be likewise associated with lower prominence scores for those entities.

However, if another article has high prominence scores for certain entities, and fewer comments or discussions are provided by way of the article having the high prominence score entities, the significance of the higher prominence scores of the entities of those articles may have a lower impact on the media forum entities because users are not contributing comments or discussions in reference or association to that article. As such, the entities in the articles will have associated entity scores that are obtained by way of the entity processing logic 130. Comments provided in the discussions associated with a specific article for a media forum that's associated to the article, will be associated a weighting value for the entities in the article, based on the number of comments made in the discussions.

For example, if a specific discussion has a lot of comments, the entities in the article having specific entity prominence scores will be associated to the media forum. This will occur for all or some comments added to discussions when the media forum is associated to other articles. The commentary provided in the media forum will therefore derive a dynamic adjustment over time to the interest graph associated with the media forum. The interest graph of the media forum is therefore an indicator of how interesting specific entities or topics are in a specific media forum at one time. Because the interests provided by users change over time, so will the interest graph of the media forum.

The media forum, utilizing the current interest graph can then be associated to other articles having entities that substantially match or equate to the prominence scores of the entities in those articles. Thus, the media forum can then follow articles having entities with specific prominence scores, which serves the media forum to users viewing specific articles, based on the content of the articles and the users' preferences or memberships.

The media forum, and the comments and discussions present in the media forums will therefore have an extended period of life, as users viewing other articles can view comments made on earlier articles mentioned or commented in the media forum. This will expose users of the media forum to content not usually presented to users, and will provide a collection of content or content that follows the interests of the media forum to new articles and content.

Figure 4B:
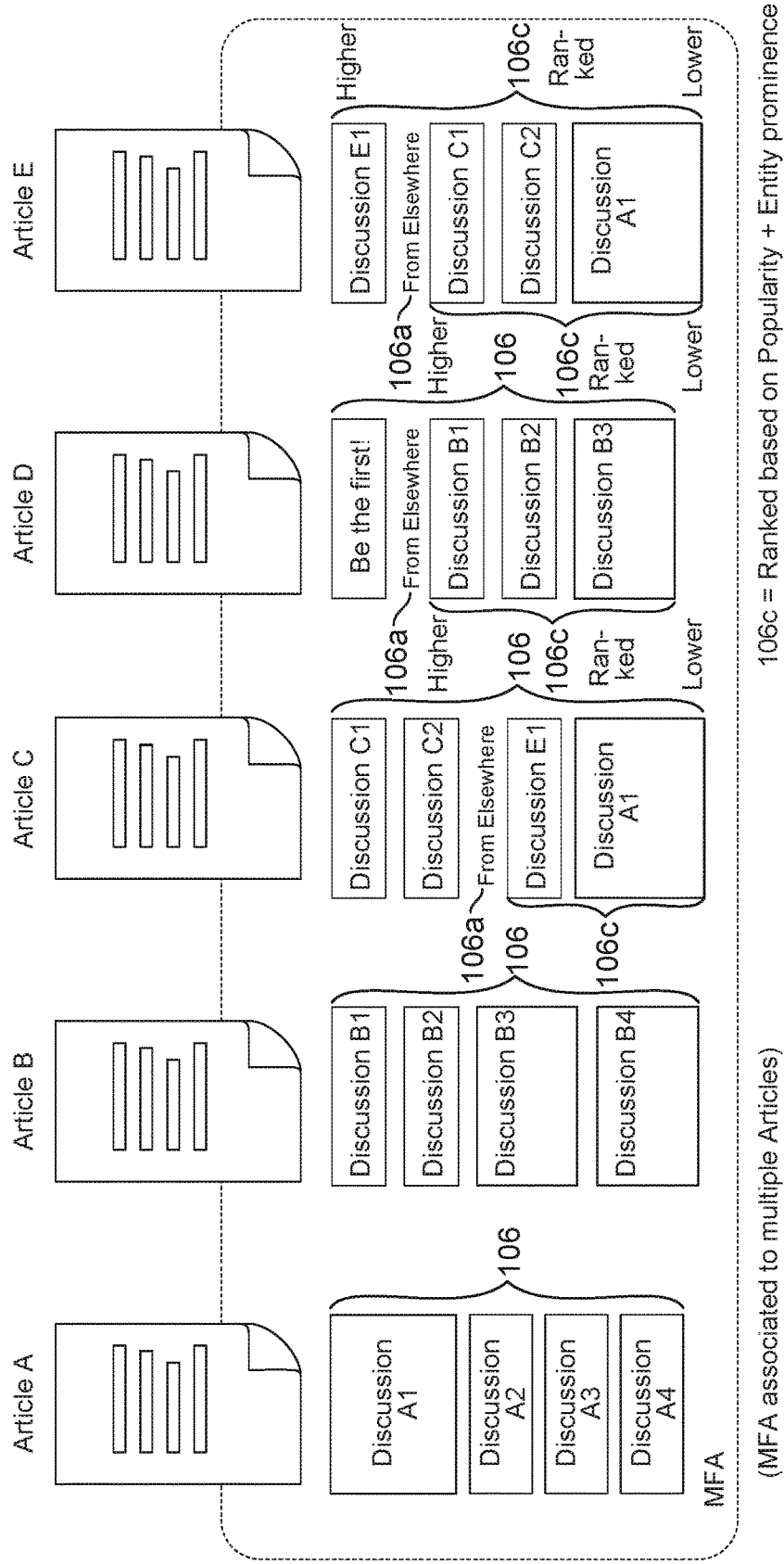
FIG. 4B illustrates an example where articles A-E are presented with an association to media forum A, similar to the example of FIG. 4A, in accordance with an embodiment of the invention.

FIG. 4B illustrates an example where articles A-E are presented with an association to media forum A, similar to the example of FIG. 4A. However, in the example of FIG. 4B, discussions from elsewhere 106a are ranked based on popularity and also based on entity prominence. For instance, if specific entities have more prominence in specific discussions, then that can be used to arrange or order the discussions in a ranked format 106c. This will surface more relevant popular content to users, along with a ranking that associates entity prominence in the determination of where to order or present the discussions to users viewing a specific article (i.e. the article that has been associated to a media forum A). In comparison to FIG. 4A, the ranking 106c will arrange the discussions closer to the top for discussions that are rated to be popular and also contain entities that most closely relate to the entities of the article being viewed by the user, which caused the media forum to be associated therewith or thereto.

Figure 4C:
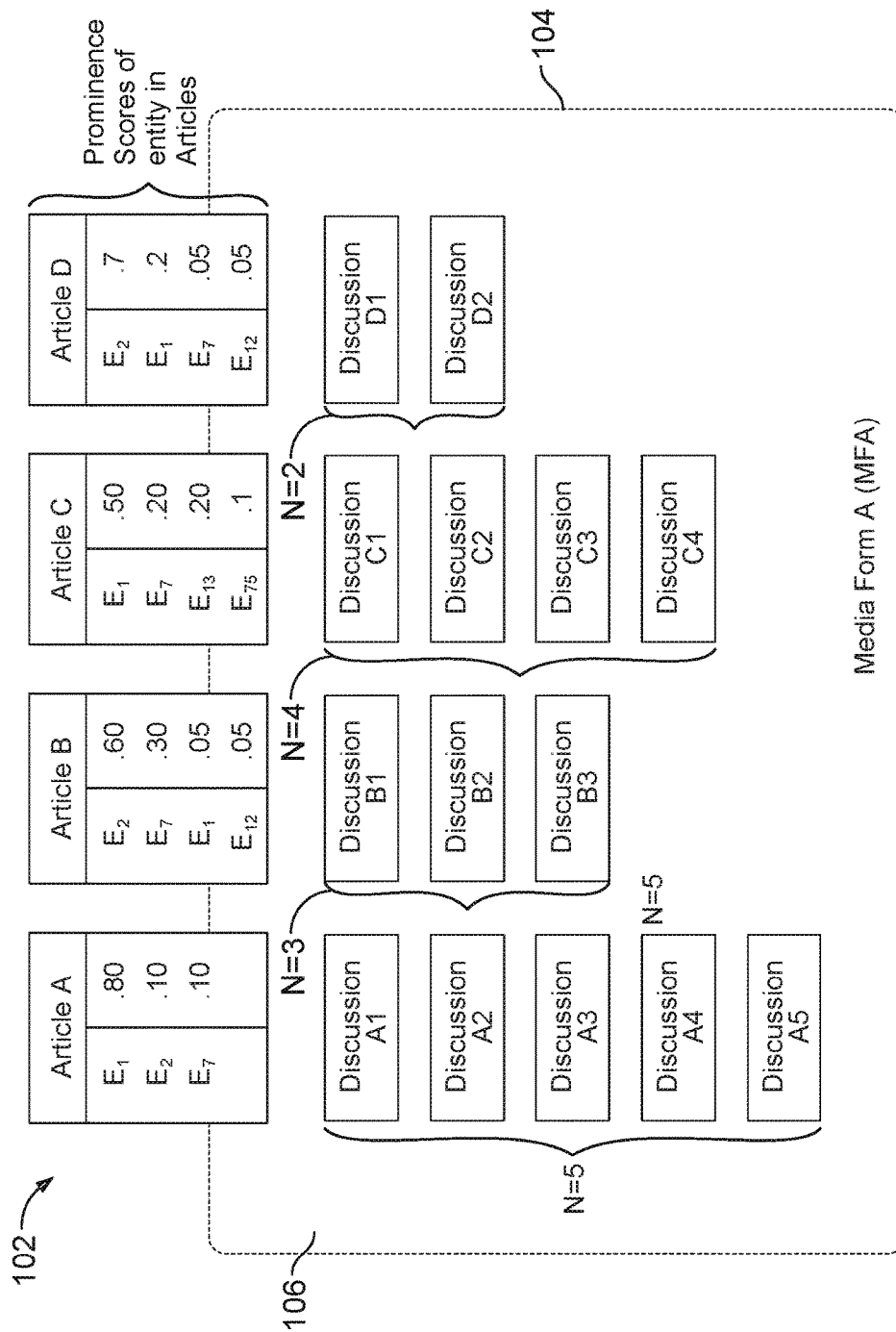
FIG. 4C illustrates an example where articles A-D are presented to include a number of entities, and the entities are associated with a prominence score, in accordance with an embodiment of the invention.

FIG. 4C illustrates an example where articles A-D are presented to include a number of entities, and the entities are associated with a prominence score. The prominence score, in one implementation, can be to rate specific entities between 0 and 1. Therefore, fractions can be used to associate the prominence level or score of the entity in the specific article. In other embodiments, other scoring mechanisms, associations, values, rankings, relative rankings, prominences, strings, importance, strengths, can be assigned to entities of an article. However, in this example the entities of an article have been assigned a specific prominence score.

Different articles can have different entities, but the association of media forum A (MFA) to articles A-D occurred because the entities in the discussions 106 and topics of the media forum relate to the entities of the articles. In one embodiment, as described above, the discussions 106 themselves can inherit some of the prominence scores of the entities. For illustration purposes only, discussions A1-A5 have been associated to the media forum A, and the discussions originated when article A was presented with the media forum A. Similarly, discussions B1-B3, C1-C4, and D1-D2 originated when the media forum was presented in relation to articles B, C and D respectively.

FIG. 4D illustrates an example where the prominence scores of the entities are tabulated in a table 200. This simple example shows addition of all the prominence scores associated with the entities found in the articles for articles that have been associated to the media forum 104 of FIG. 4C. Using this calculation method, a prominence score of entities of the media forum A (MFA) can be ranked, as shown in table 202 of FIG. 4E. The ranking shows that entity E1 has the highest prominence score in the collection of articles that have been associated to the media forum over time. In some embodiments, certain articles that were associated with the media forum at a particular point in time can be disassociated. This can occur when certain entities drop off an interest in the media forum. In other embodiments, users can specifically request to remove entities from a media forum.

FIG. 4F illustrates an example where the ranking of the entities for the media forum can be adjusted by any number of weighting inputs 250. In this example, the ranked entities can be re-ranked or adjusted by applying various types of weightings to the entities associated with a specific media forum. For instance, the weighting can be adjusted based on the volume of discussions or volume of comments in specific discussions.

In other embodiments, the weighting can be adjusted by considering the user feedback provided in the media forum. Votes provided regarding specific comments or discussions can also be used for weighting. Other metrics that can be used as a weighting input can include popularity data, new membership data, suggested topics in the media forums, likes, dislikes, member profiles, social media graphs, associations with specific social groups, a number of friends, links or friendships with important people, the strength of a user's reputation in a media forum, etc. Accordingly, the prominence score of specific entities in the media forum can be read tabulated in operation 252 based on the weighting inputs 250, which will cause a dynamic adjustment of the prominence scores of the entities in the media forum in operation 254.

FIG. 4G illustrates an example where the entities in a media forum are collected over time and adjusted over time based on their association to specific articles having entities with specific entity prominence scores. In this example, the weighting can be performed based on volume of discussions 260. As illustrated in FIG. 4C, the number of discussions is shown with a value N, where article A includes five discussions, article B includes three discussions, article C includes four discussions, and article D includes two discussions. The weighting performed in FIG. 4G, in operation 262, will therefore include a multiplication of the number of discussions N by the prominence score of the specific entities. The result of this processing and summation of the resulting scores for each entity associated with a media forum A, will therefore be processed in operation 264.

The resulting calculation will show that the prominence score for E1 is the highest in the media forum A, while entity E2 and E7 both have the same prominence score. Other entities E12, E13 and E75 also show their associated entity scores for the media forum. FIG. 4H illustrates a table 220' having modified prominence score of the entities in media forum A (MFA). The modification is the result of applying the weighting algorithm that takes into account the number of discussions originating from specific articles that the media forum was associated therewith.

As described with reference to FIG. 4F, there are many different ways of adjusting the prominence score entities associated with a media forum. The volume of discussions weighting described with reference to FIGS. 4G and 4H represent one such technique. Without limitation, other techniques may also be used to provide a weight to the entities that are associated with a media forum based on the discussions, comments, user feedback, voting, etc. provided by interaction with the media forums.

Figures 4I, 4J:
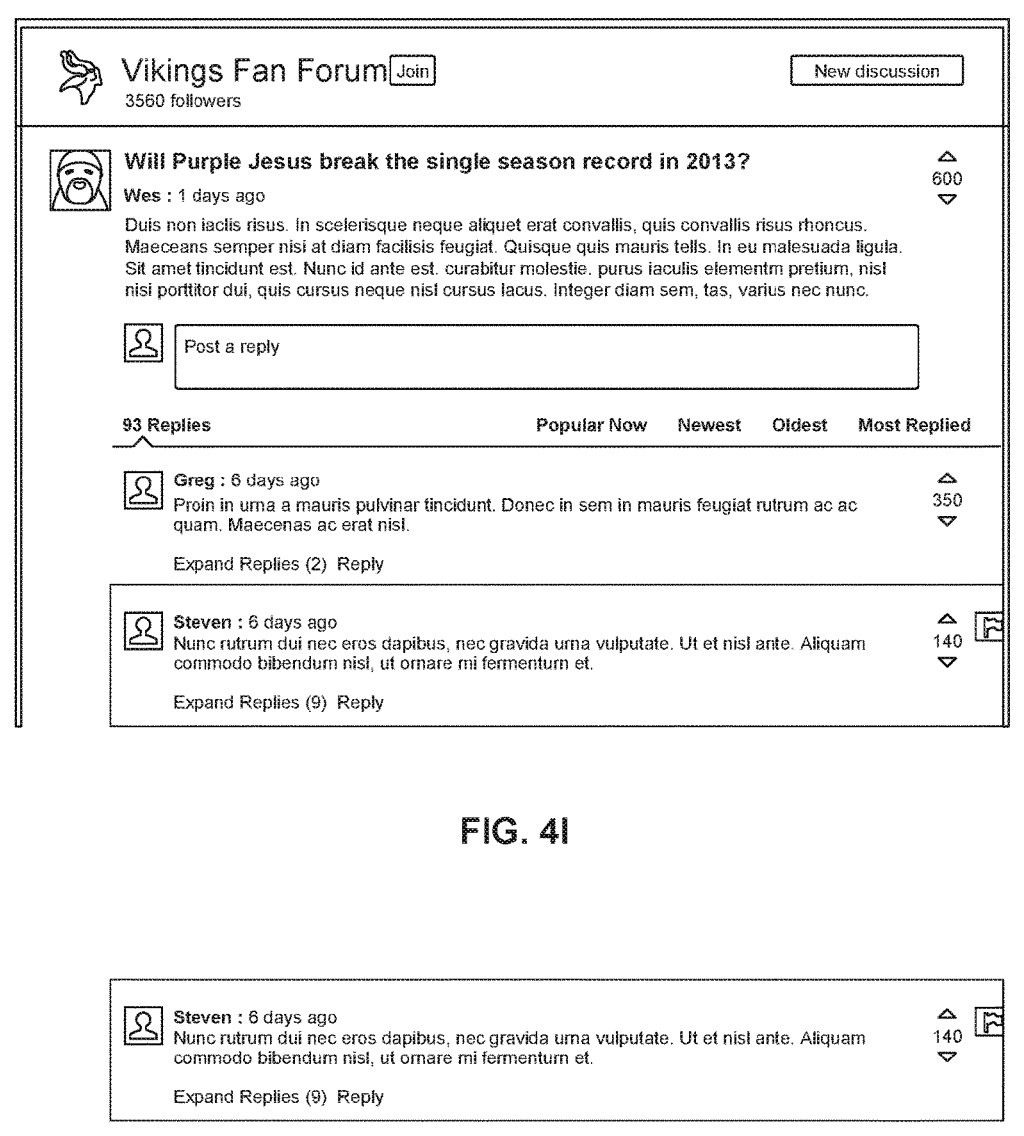

FIGS. 4I and 4J illustrate example screenshots, interfaces, graphical user interfaces (GUIs), modules and presentations of a media forum, which in this case is a media forum for the Minnesota Vikings, labeled "Vikings fan forum". In an alternate embodiment described with reference to FIGS. 4I and 4J, the ranking of entities in specific media forums can be based at the discussion thread level, as opposed to the discussion level itself (e.g., As described with reference to FIGS. 4G and 4H).

For example, in the thread shown in FIG. 4I, entitled, "Will Purple Jesus break the single season record in 2013?", users have voted each of the posts up or down. The original post, for example, has 600 more up votes than down votes. The reply below it has 350 more up votes than down votes, etc. So each post by users has a built-in popularity weight. In one example, it can be assumed that a discussion thread has 1 post and 2 replies. The original post and the first reply originated from association with Article 1. Also, for this example, Article 1 has 3 entities:

E1=1.0
E2=0.2
E3=0.1

The second reply, shown as FIG. 4J, originated from association with Article 2 with these entities:

E3=0.9
E1=0.8

In this alternate example embodiment, in order to find the entity score for this entire discussion thread, we multiply:

From Article 1: E1=1.0*(600+350)=950
From Article 1: E2=0.2*(600+350)=180
From Article 1: E3=0.1*(600+350)=95
From Article 2: E3=0.9*140=126
From Article 2: E1=0.8*140=112
Total entity ranking for this discussion thread:
E1=950+112=1062
E3=(95+112)=207
E2=180

This example is provided for two example articles, but as the number of articles to which the media forum is associated increases, the resulting entity prominence scores will likely stabilize with a more informative distribution. For instance, in the above example because only 2 articles are processed and only 3 entity types are addressed, the prominence score of entity one is shown significantly greater than entity 3. However, as more use of the media forum occurs, and users add comments, provide votes, and discussions, suggest topics, etc., the entity scores for the media forum will also change over time, which will function to fine-tune the interest graph of the media forum.

Figure 4K:
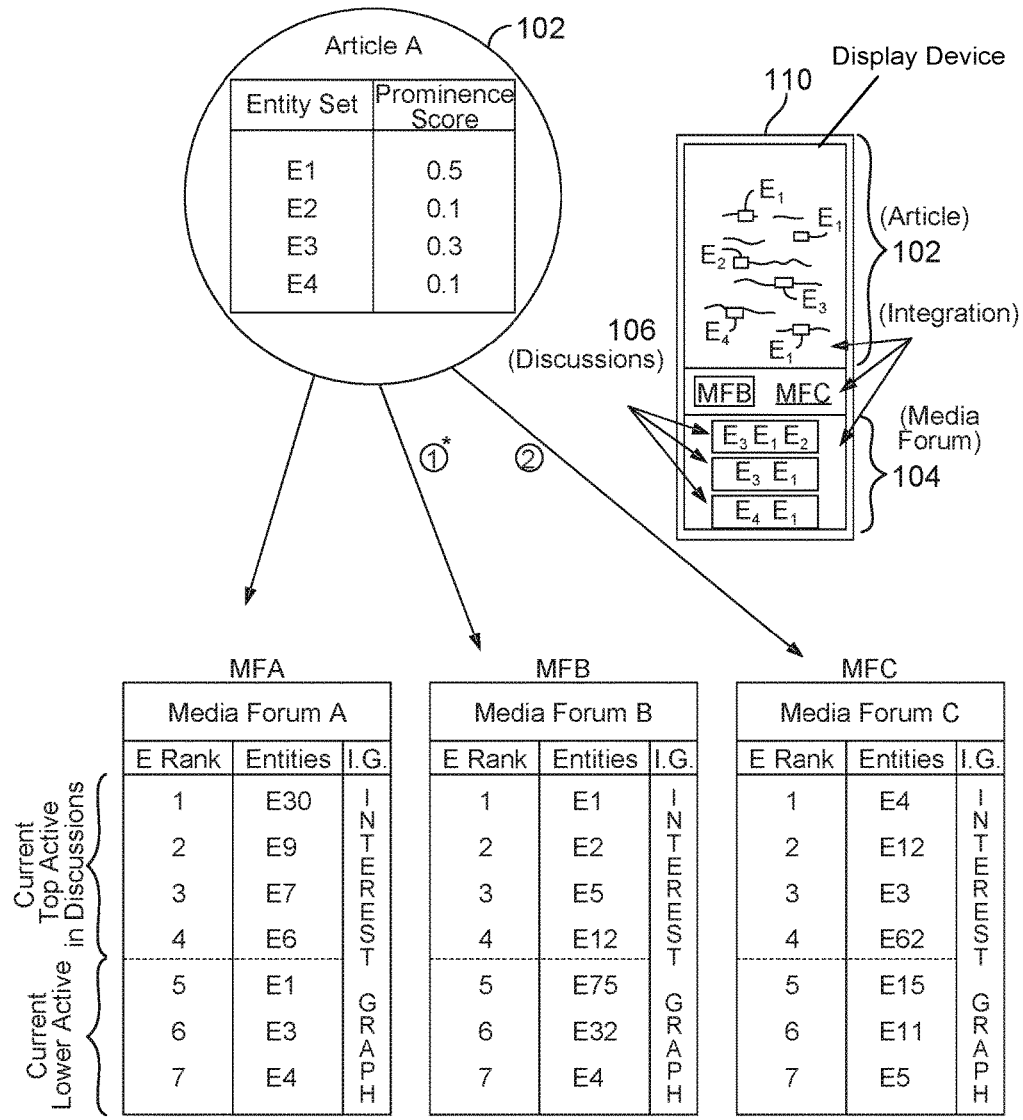
FIG. 4K illustrates another example where an article A may include an entity set, and associated prominence scores, and a determination of which media forum the article should be associated with, in accordance with an embodiment of the invention.

FIG. 4K illustrates another example where an article A may include an entity set, and associated prominence scores, and a determination of which media forum the article should be associated. In this example, each media forum can include a plurality of entities, and the entities are ranked based on the strengths of the prominence scores of the entities in the media forums. In one embodiment, certain entities in the media forum will be the top active entities in current discussions or comments. In other embodiments, lower active entities may also be identified, for a particular time.

As noted above, entities in a media forum change over time and so can the prominence scores of the entities in the media forum as the corresponding interest graphs change or adjust. The interest graph of the media forum will change or adjust dynamically based on user input. The user input, as described above, can include users posting comments, replying the posted comments, providing feedback, voting on whether certain comments are significant or not significant to the user, suggestion of topics, etc. At a particular point in time, the interest graph of the media forum will show which entities are most significant by ranking their prominence scores associated with the entities.

Using the prominence scores assigned to the entities in the media forums, a determination can be made as to which media forum to associate to a particular article. In this simple example, media forum B is one that has entities having elevated prominence scores which closer relate to the prominence scores in article A. For this reason, the system may choose to associate, or suggest to associate media forum B (MFB) 104 to article A 102. The system will therefore integrate, in one embodiment, the placement, presentation, reference, link, or identifier to MFB when the article is presented on the display device 110.

In this alternate embodiment, media forum 104 can include a number of discussions 106, and the discussions themselves can include content related to the entities. In this example, the system may additionally look to the entities described, recited, entered, commented on, in the discussion thread's 106. By looking at the entities in the discussions and comments themselves, it is possible to associate a prominence score of entities described in the media forum.

In still another embodiment, it is possible to allow users to provide a tag or identifier to specific discussions or comments. For instance, the system can provide the question to the user, such as, "Do you wish to reference this discussion/comment in relation to which of the following entities." Other similar questions, feedback icons, pop-up Windows, display dialogs, links, messages, selection functions, or the like can be used to obtain information from users who may wish to associate their comments or discussions to a specific entity. Using this information, the system can associate the comments or content of the comments to specific entities, which in turn allow for a ranking and association of the prominence score to the entities in the discussion threads.

Figure 5:
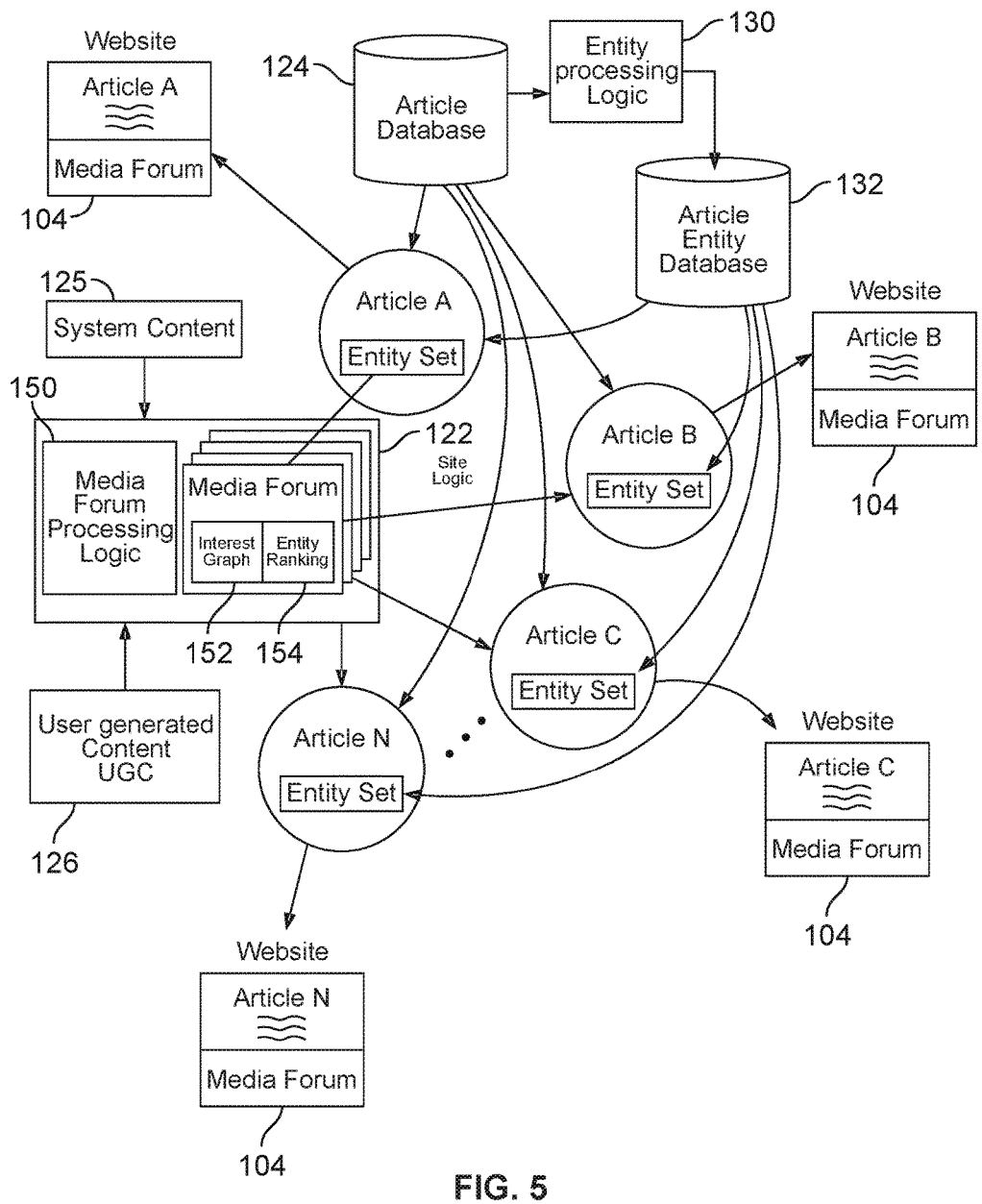
FIG. 5 illustrates an example where site logic can utilize the media forum processing logic, the interest graph of the media forums, and the entity rankings to determine which media forum will be associated to specific articles, in accordance with an embodiment of the invention.

FIG. 5 illustrates an example where site logic 122 can utilize the media forum processing logic 150, the interest graph 152 of the media forums, and the entity rankings 154 to determine which media forum 104 will be associated to specific articles. In this example, site logic 122 is in communication with user generated content 126 and system content 125. The system content can allow for formatting, communication, management of data, database arrangement, integration, and display of media forums or association of media forums to articles. As shown, articles A-N will include their entity sets. Each entity set is a set of one or more entities that are associated with the article.

The entities in the entity set are also associated with an entity prominence score, which is assigned, based on the entity processing logic 130 processing, which analyzes the article database 124 and produces the article entity database 132 containing the entity sets for each article. As shown, the entity processing logic has access to the article database 124 and the entity database 132 is associated with each entity set. The articles are then associated with a respective media forum 104, which matches or is best associated to the article based on the entities in the article and the entities and scores of the media forum an article. An additional filtering metric can also include identifying whether users or specific users have been associated to specific media forums, such as by joining the media forum or becoming a member of media forum.

Figure 6:
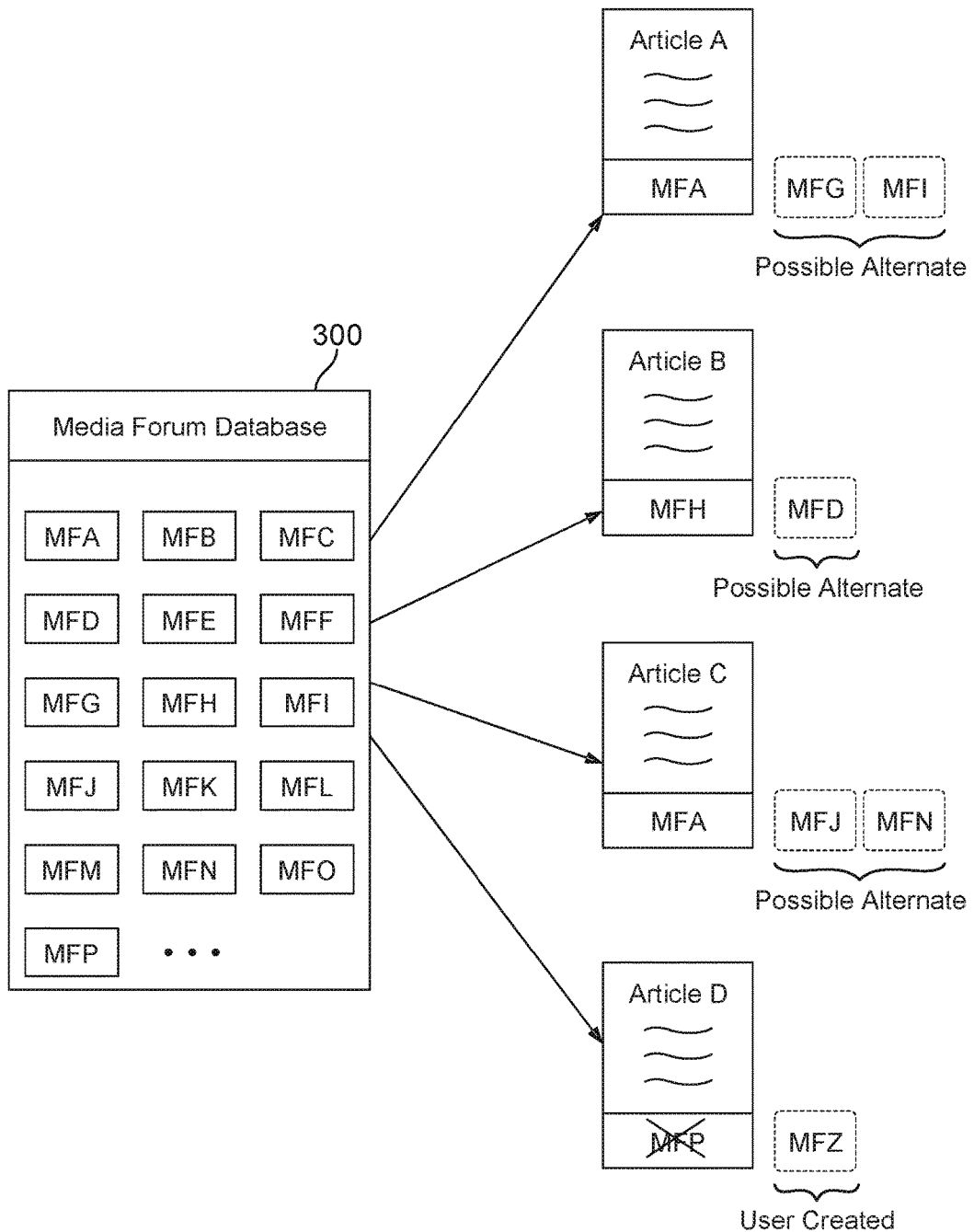
FIG. 6 illustrates an example of a media forum database, in accordance with an embodiment of the invention.

FIG. 6 illustrates an example of a media forum database 300. The media forum database 300 can include a number of media forums MFA-MFP, which are accessible to users upon accessing an article, or accessing the landing page of the media forum. In this example, certain articles are associated with specific media forums based on the entity scores and associated interest graphs of the media forums. As noted above, the interest graph of media forums change continuously over time, based on the user interaction with the media forums. Accordingly, any association of the media forum to an article will occur at any point in time based on the current interest graph.

An association that was valid on one day may not be valid the next day or the next hour or next minute, depending on how fast the interest graph is changing. The interest graph therefore acts as the brain for the forum, which allows dynamic association of the media forums to articles based on the current content, interaction, demographic, or interests of the users accessing the media forums. In this example, media forum MFA is associated with article A as well as to article C, and media forum MFH is associated to article B. In one embodiment, other possible alternate media forums can also be shown to the user.

For instance, if the user is accessing an article related to a political campaign, the article may be discussing to political campaign opponents. It is possible that the viewer of an article supports a specific politician, and the associated or recommended media forum may be the opposite to which that user wishes to comment on. In one embodiment, alternate possible media forums are presented to the user in the form of links, pull-down menus, selection buttons, entry text fields, or any other interface. The user can also perform a search in the media forum database, in case the media forum exists for that specific entity (e.g., candidate or topic). In one embodiment, the user can also create a new media forum, such as media forum MFZ, which the user chose to associate with article D.

Figure 7:
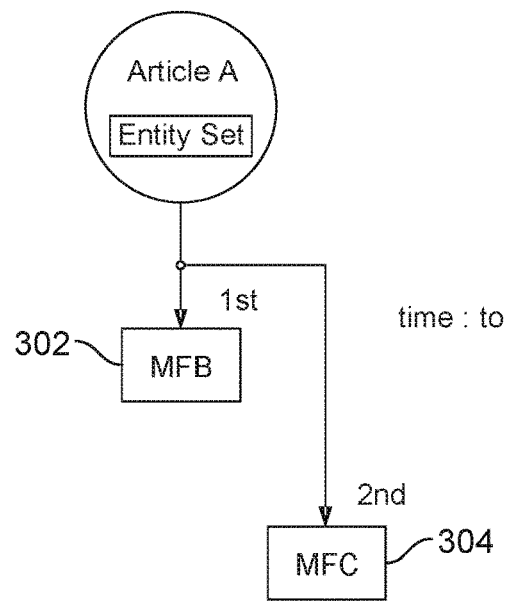
FIG. 7 illustrates an example where at a particular point in time, media forum MFB is selected to be the first best match to present to the user viewing article A, in accordance with an embodiment of the invention.
Figure 8A:
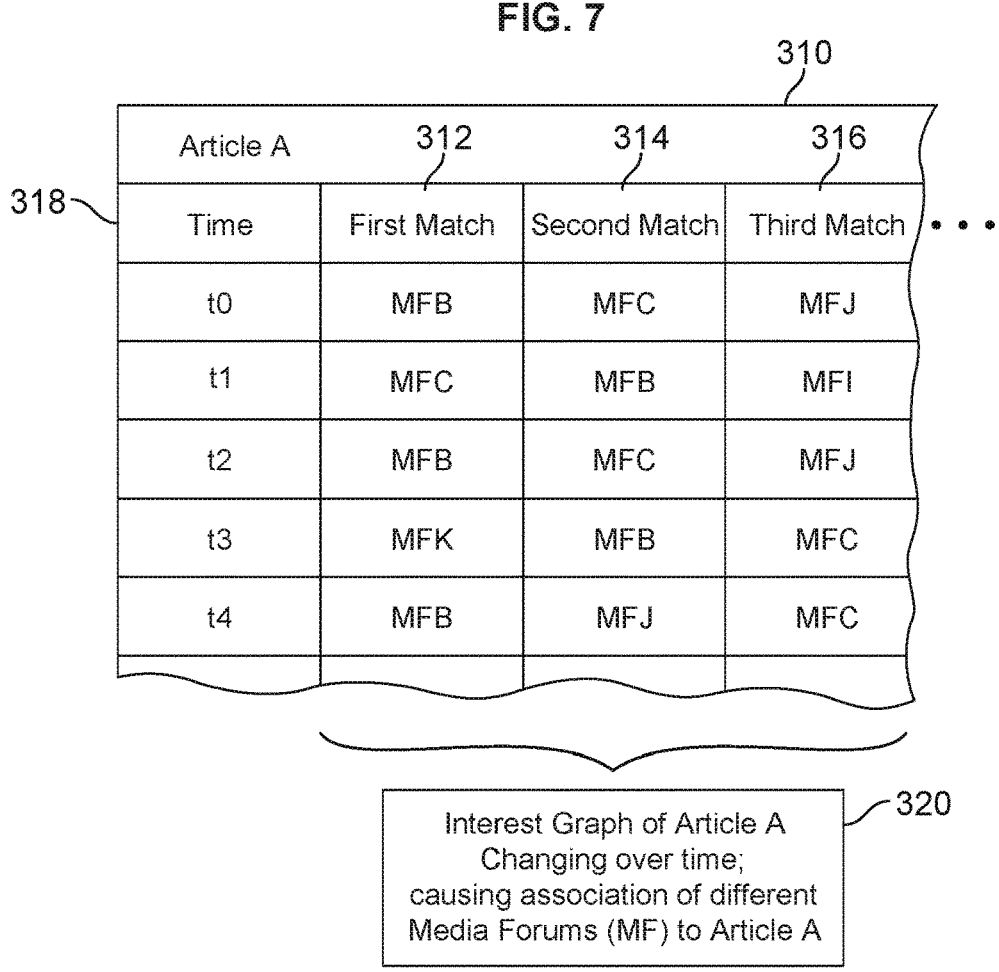
FIG. 8A illustrates a table where the media forums that are best associated with article a can change over time, in accordance with an embodiment of the invention.

FIG. 7 illustrates an example where at time to, media forum MFB 302 is selected to be the first best match to the present to the user viewing article A. The second best match may be media forum MFC 304. FIG. 8A illustrates a table 310 where the media forums that are best associated with article A can change over time 318, between time to and t4. In this example, the system may identify a first match 312, the second match 314, and the third match 316. It should be understood that other matches may also be generated, or presented to the user as alternates.

However, because the interest graph in the media forums continuously changes over time, the media forums recommended for association to article A will also change. In addition, determinations can also be made as to who the user is, the demographic of the user, the location of the user, the geo-location of the user, the IP address of the user device, where the user has provided comments, whether the user is logged in, where the user is a member a specific media forums, and any combinations thereof. The matches are therefore arranged or selected based on the likelihood that the media forum is best suited, based on current interest graphs of the media forums and the entities in the article and scores 320.

Figure 8B:
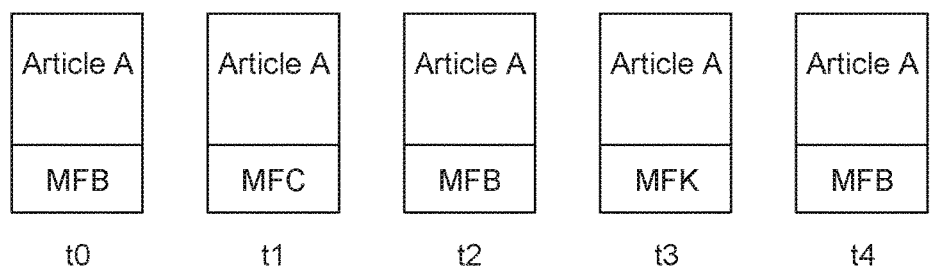
FIG. 8B illustrates an example where article A will have different media forums MFB, MFC, MFB, MFK, MFB, assigned over time, in accordance with an embodiment of the invention.

FIG. 8B illustrates an example where article A will have different media forums MFB, MFC, MFB, MFK, MFB, assigned over times to, t1, t2, t3, t4. This illustration is provided to emphasize that the interest graph of media forums do change, as entities in media forums gain in prominence or decrease in prominence, as the interests of users accessing the media forums change.

Figure 9A:
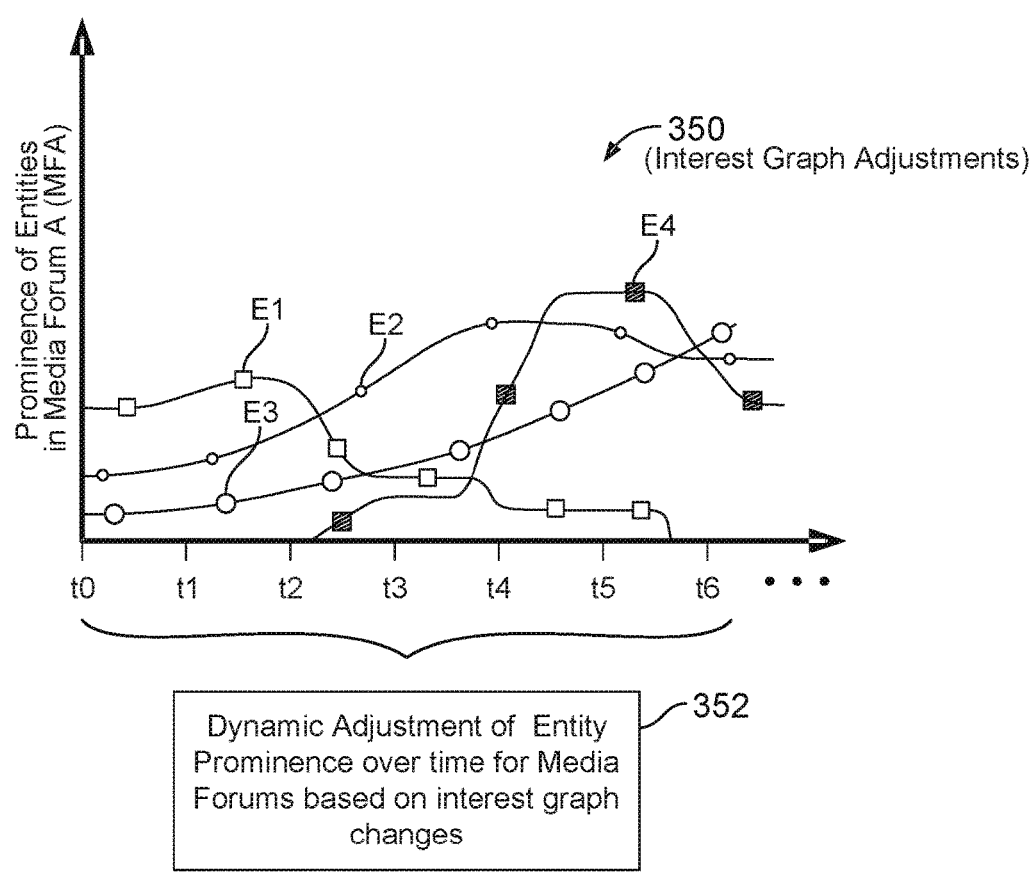
FIG. 9A illustrates an example of the dynamic nature of interest graph adjustments that occur over time, in accordance with an embodiment of the invention.

FIG. 9A illustrates an example of the dynamic nature of interest graph adjustments 350 that occur over time. This illustration shows the dynamic adjustments of entities E1, E2, E3, and E4. The vertical axis represents the prominence of entities in a media forum A (MFA). Over time it is shown how entity E1 declines, and by the time t6 occurs, entity E1 is no longer relevant or has a very low prominence score in the media forum.

In contrast, entity E2 has a progressively increasing prominence score until time t4, and then a slight gradual decrease begins to occur. Entity E3 shows a semi-constant steady increase over time, which can mean that entity E3's prominence score increases as users comment more on articles that have entity E3 or E3 is more significant or relevant to the topics discussed in the media forum MFA.

The example of entity E4 shows the appearance at time t2, a gradual increase and then a significant increase at time t4. Then, E4 starts to decline significantly. This may be the profile associated with an entity that becomes a significant news item or discussion topic at a particular point in time and then the topic dies out in the media forum. Accordingly, entity prominence in the media forum will be dynamically adjusted 352 over time for the media groups based on the interest graph changes.

Figure 9B:
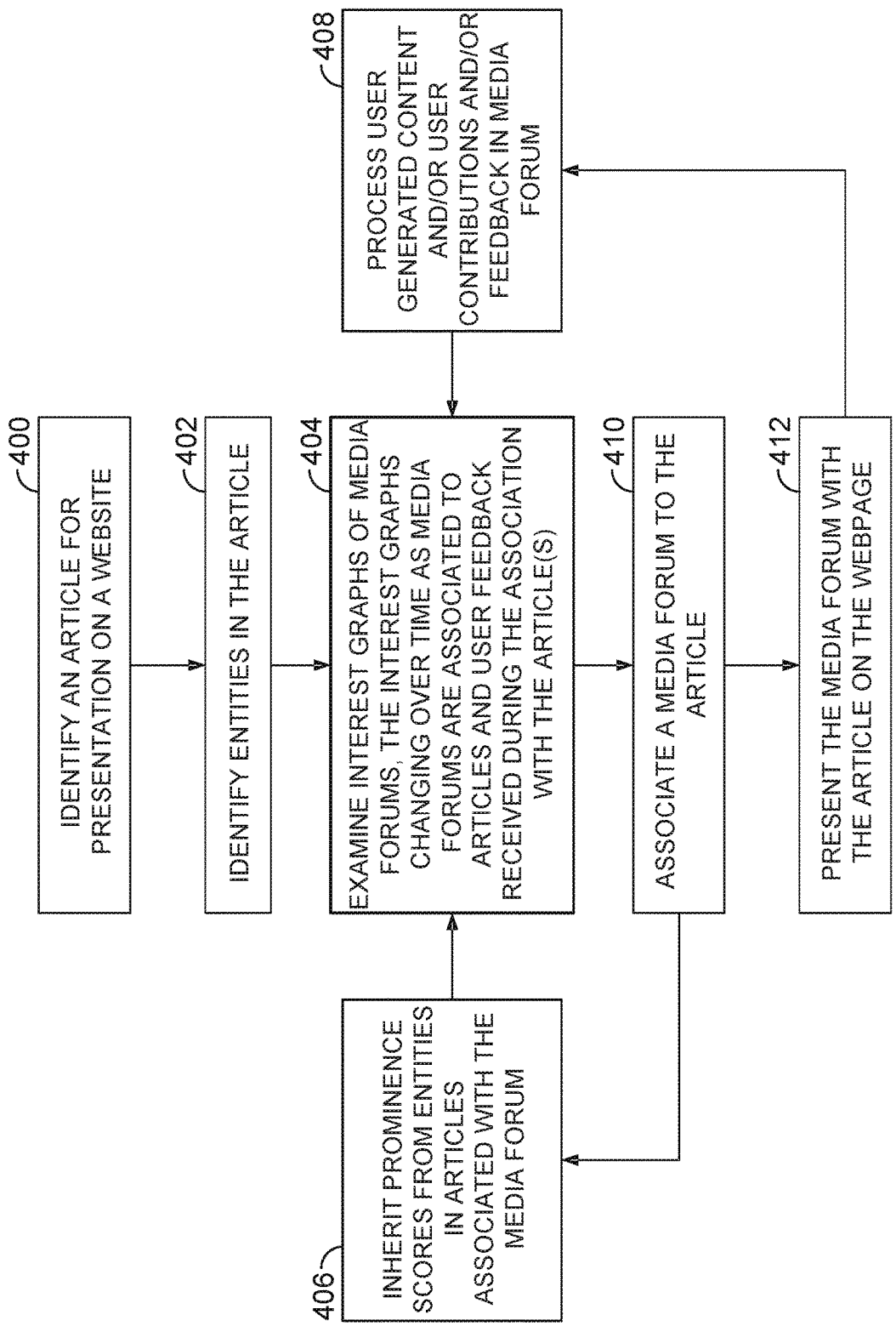
FIG. 9B illustrates an example flow or processing performed to manage media forums, in accordance with an embodiment.

FIG. 9B illustrates an embodiment where media forums are associated with articles having entities, and the interest graph of the media forum changes over time. The process begins in operation 400, where an article is identified for presentation on a website. The presentation of the article can include, for example, displaying the article in an open format on a webpage, selecting a link to open an article, navigating to a website with an article, or viewing content on an application via a mobile device that can present content or an article.

In operation 402, entities in the article are identified. Identification of the entities can include referring to a database that identifies the entities and their prominence scores in the article. In another embodiment, the article can be processed on-the-fly to identify the entities in the article, and assign prominence scores to the various entities. In operation 404, interest graphs of media forums are examined.

In this embodiment, media forums can be managed or stored in one or more databases. The interest graphs of each of the media forums at a particular point in time can be examined to determine which media forums have specific entities associated therewith and the relative entity prominence scores in the media forums. The interest graphs will therefore change over time as the media forums are associated to articles and user feedback is received during the association of the media forum to one or more articles.

In operation 410, a media forum is associated to an article. While the media forum is associated to the article, the media forum will inherit the prominence scores of entities in the article so as to adjust or impact or change the interest graph of the media forum. The prominence scores from entities in other articles for which the media forum(s) have been associated with are also inherited to the media forum(s) in operation 406. The Association of the media forum to the article in operation 410 also functions to cause the inheriting of the prominence scores in the article to the media forum that was associated with article.

In operation 412, the media forum is presented with the article on the webpage. As noted above, the media forum can be associate to a webpage that includes the article, and the location and form in which the media forum is associated with article can vary depending on the designers format or presentation preferences.

In operation 408, user generated content and/or contributions by way of comments and/or discussions to the media forum are captured and processed. The processing of the user generated content and or user contributions and/or feedback in the media forum will therefore be provided back to the interest graph of the selected media forum to convey adjustment. Accordingly, the media forum will continually change and continually adjust its interest graph based on its association to specific articles as well as in response to the processing of user generated content, and/or contributions, and/or feedback received from users in the media forum.

FIGS. 10A through 10J illustrate examples of a media forum utilized in the context of sporting articles. It should be understood that the content can be any content, and the description or illustrations regarding football and sports are simply to provide context to the examples associated with providing media forums that are related to articles or content.

Figure 10A:
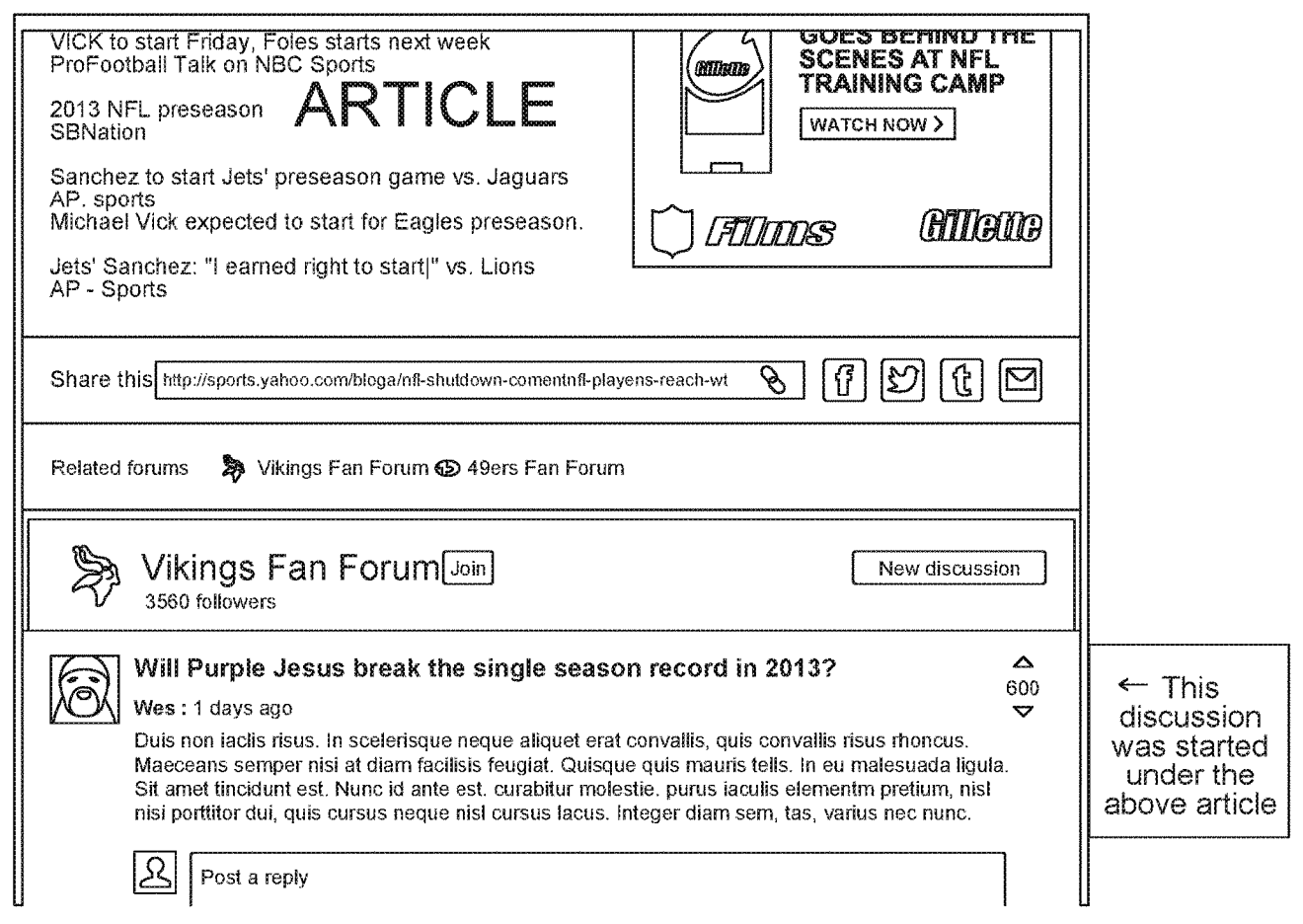

With this in mind, FIG. 10A illustrates an example where an article can be displayed on the website, and when the user scrolls down to the end of the article, a separate section defining a media forum is displayed. As shown in the drawing, at the bottom of the article, a user may be presented with one or more related media forums, which in this case is a Vikings fan forum and a 49ers fan forum. The user can also be provided with the option to select other forums by way of a pull-down menu or other selection mechanism. In this illustration, the user has either selected to view the Vikings fan forum, which opens the fan forum below the article, exposing one or more discussions, and comments associated with the particular discussions.

Additionally, viewers of the media forum can also vote up or down specific discussions or comments. The illustrated discussion, for example, shows that it has received 600 positive votes while being displayed in the specific Vikings fan forum. The user is also provided with selection means for starting new discussions in the media forum. The discussion listed below the article in FIG. 10A, in one embodiment, will identify that the discussion was started under the above defined article.

Figure 10B:

FIG. 10B illustrates an example where multiple comments associated with a particular discussion can be nested below the original discussion thread. The media forum, in one embodiment, will be attached, displayed, or associated below or in some other location with association to an article. In cases where few discussions have been started for a particular article, the system may provide discussions related to the article from other articles. For instance, an indicator can be provided in the media forum to notify the user that the discussion being shown originated or was added to the media forum when the media forum was associated to another article. In this manner, a fuller and richer experience regarding the media forum can be provided to the user, which will also expose the user to other content (e.g. other articles) that may relate to the content in the media forum, and other than the article that the user was originally viewing or accessing.

Figure 10C:

FIG. 10C illustrates an example where the indicator notifying the user that additional discussions originating from elsewhere (e.g. from other articles), are displayed in the specific media forum. The user can then navigate to any of the discussions, participate in the discussions, provide votes regarding the discussions, etc.

FIG. 10D illustrates an example where an original discussion was posted to or added to a media forum. In some embodiments, the discussion posted to a media forum in relation to a particular article may also be posted in the media forum in relation to other articles where comments were made in relation to the discussion. In the media forum, the user can be notified as to where the specific discussion was commented on in relation to other articles. This identification of where the discussion was commented on, and the articles that were displayed when the comments were added provides a way for users to discover related content throughout a network, or other webpages, including third-party webpages.

Figure 10E:
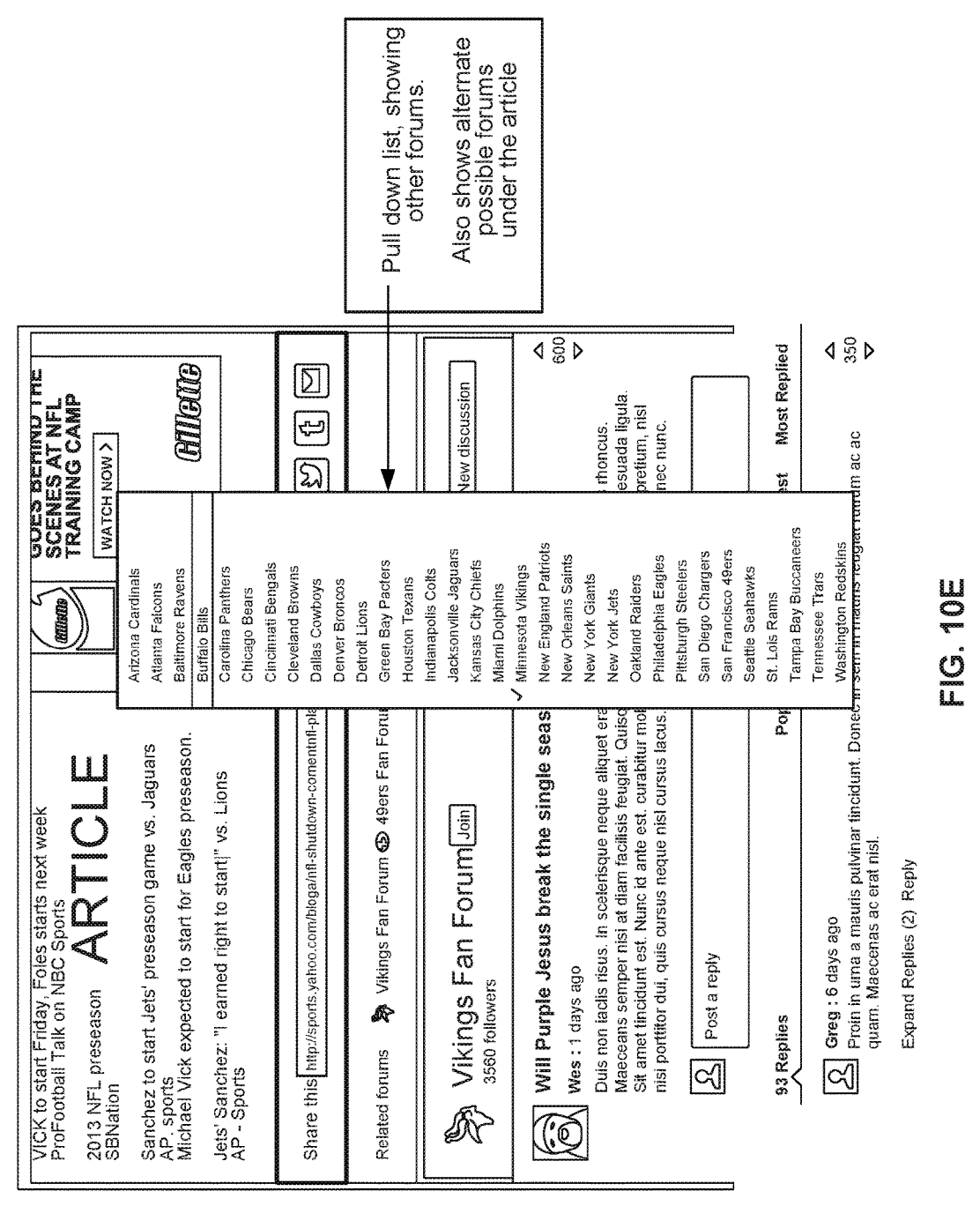

FIG. 10E illustrates an example where the user is provided with the functionality to select other media forums. Other media forums can be selected, in one embodiment, by selecting a pull-down menu that provides a listing of other media forums that may relate to the article. In this example, the article related to football, and therefore related media forums may include fan forums associated with other football teams.

FIG. 10F illustrates an example of a webpage defined for a specific entity, such as the Minnesota Vikings. In this example, the webpage may display information regarding football games that are on the schedule for the entity. In one embodiment, this content page can also be provided with a link to a media forum that relates to the entity Minnesota Vikings. In this implementation, the content on the webpage will include entities with prominence scores that will enable association of a media forum for that content. As such, it is not required that the content be an article, but it can also be a webpage. The webpage can be on a network of content, or on webpages that are operated or handled by third parties.

FIG. 10G illustrates an example where a media forum is presented with a plurality of discussions. The media forum may be provided with a functionality to illustrate the content in a discussion view format, which is shown. In another embodiment, the content may be displayed in relation to an article view. The article view may provide a link to the original article at which the comment or discussion was started or entered. In another embodiment, in the "article view", a short description or summary may be provided regarding the article or content. In this manner, users can be provided with an identification of where the comment or discussion originated when it was associated to the media forum. In still another embodiment, the entities described or commented on in the media forum can also be ranked.

The ranking can be illustrated to users in a window that identifies the most discussed topics (e.g. entities). The listing of most discussed entities, in one embodiment will change dynamically over time as the content added to media forum, in relation to the articles having the entity prominence scores, change. Also illustrated is an example where the media forum can surface a dialogue or interfaced to a user requesting feedback as to whether more or less content related to a topic should be displayed in the media forum. By receiving this feedback from users, the media forum can be organized and the interest graph of the media forum can change based on the feedback provided by users. In still another embodiment, users can provide feedback by suggesting topics (entities) for the media forum.

Figure 10H:

FIG. 10H illustrates an example where the media forum can be viewed independent of articles, in one embodiment. In this embodiment, the media forum can be viewed as a landing page for the media forum. The landing page includes a plurality of discussions, and comments regarding the discussions. In the landing page, discussions can also be related to specific articles. For example, a short summary of the article can be provided just above the listing of the discussions, which will provide the user with context regarding the posting of discussions or comments for discussions. This particular example also illustrates the article view provided by the media forum. In another embodiment, the summary can also be an active link that will take the user to the original article. In another embodiment, the article may reside on a third-party website. In another embodiment, the article can be completely displayed in the media forum by clicking or selecting and "expand" or "more" icons or links.

Figure 10I:
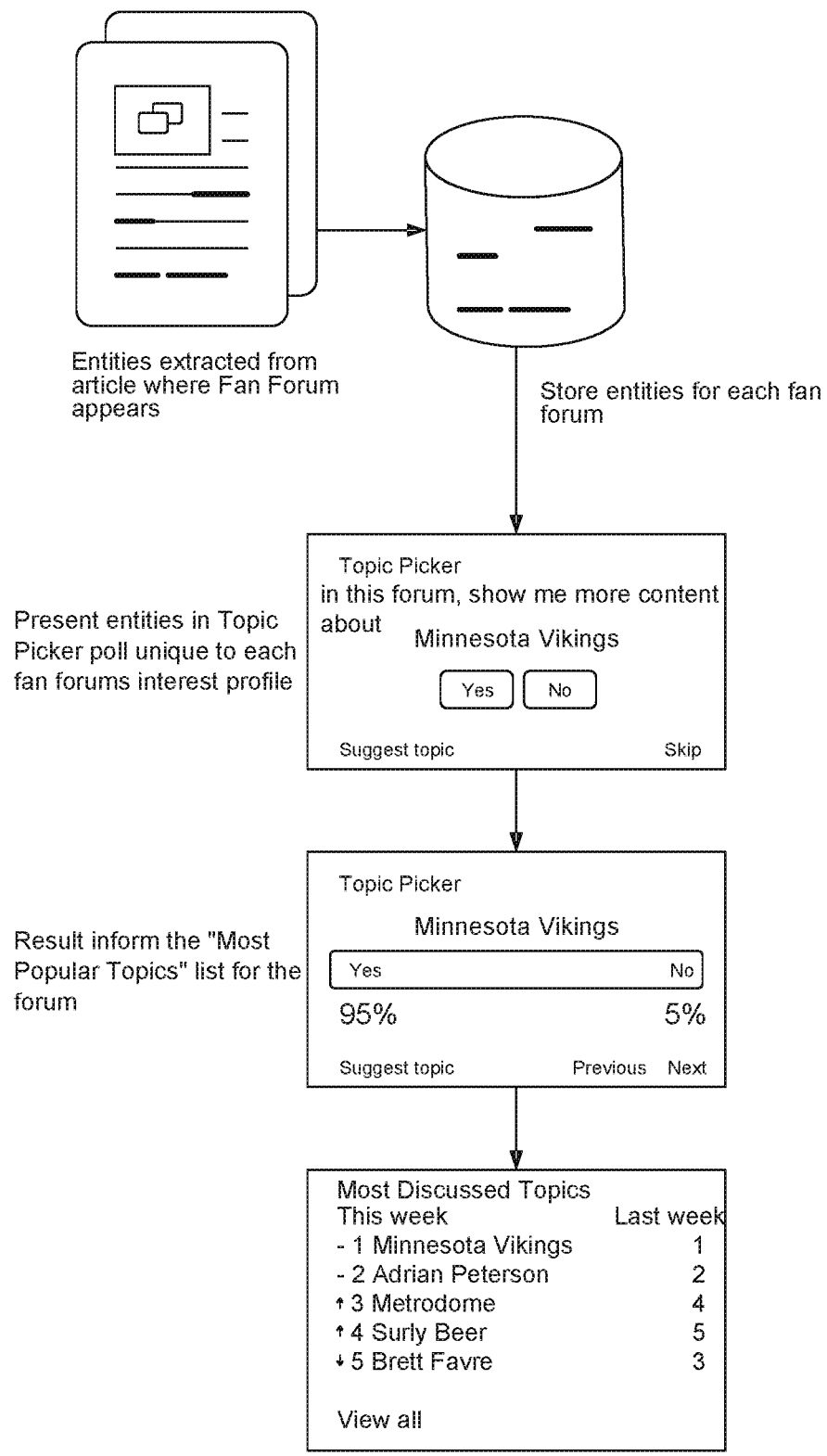

FIG. 10I illustrates an example where entities in an article are extracted to define the entities in the article and associate their prominence scores in a database. The files for each media forum can also be stored to a database, which will enable dialogues or messages to be rendered on media forums to allow users to provide input regarding topics for the media forums. Users can be provided with dialogues or messages that allow voting regarding existing topics or demotion of topics not of interest to specific users. Dialogues, icons, messages, or screens can also be provided to show which entities are most discussed in specific entity forums.

Figure 10J:
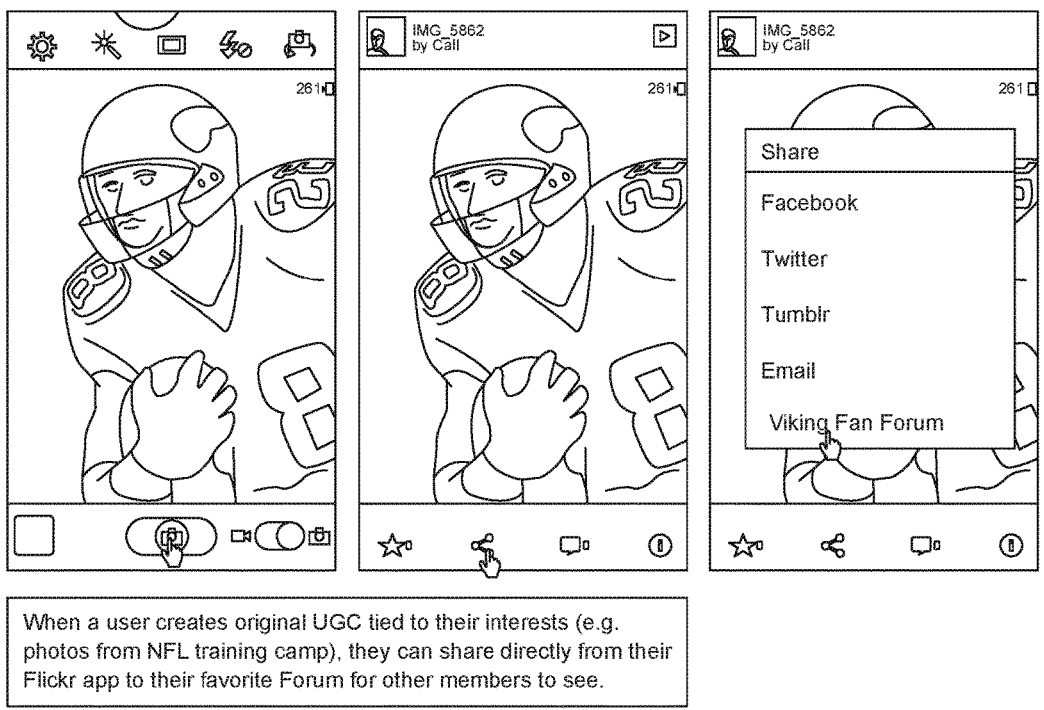

FIG. 10J illustrates an example where users may capture images from various locations and tag the images for a specific media forum. The images or content tagged for specific media forum can then be associated to the forum as the originating content. Discussions can then be had regarding the posted content, and comments can be added and/or votes can be cast regarding user interest in the content. This example provides the flexibility of having media forums that conform to user interests, and how media forums can be associated to existing content such as articles, or be associated to content that is created (e.g. photographs taken, messages made, e-mails, postings, social network activity, etc.).

In some embodiments, the methods and systems can perform additional matching of forums to articles or content by additionally considering the logical overlap or similarity of a user's interest graph. For example, in addition to considering the entities in an article and the entities in the interest graph of a media forum, the system can additionally analyze the entities in a user's interest graph. This system, in one embodiment, is further facilitated when a user is logged in to a system, website, or service, or the user is a member of a media forum.

The user's interest graph, in one embodiment, goes beyond that user's activity in media forums, but can also include activity in social networks, postings in websites, comments in websites, a user's identified interests, the user's profile, the user's location, the user's friends, the user's accounts, the user's express indications of likes or dislikes, and historical search or interactions from databases or data about the user obtained from any database in which the user has made information available or where public information is available.

In another embodiment, the methods and systems described herein are implemented for use in mobile technologies. For example, users are increasingly using mobile devices, such as smartphones, tablets, laptops, digital organizers, etc. to access content on the Internet. To accommodate the form factor of such devices, which are usually more compact that traditional desktop displays, content producers and content suppliers have formatted and engineered their content to provide better navigation and presentation on such mobile devices. In one embodiment, the content is provided via applications (APPs), which are designed for specific types of mobile devices. Certain applications are, in one embodiment, defined for the specific operating system of the device. Applications that present content can be downloaded to a user's device from an online site, store or marketplace. The application, once installed, is configured to interface with the content providers, and the content providers for such applications will serve the content back to those devices in accordance with the navigation and presentation constraints of the devices.

In the context of mobile devices, users can capture data in many ways. The capturing of data can include, for instance, capturing images (e.g., pictures/photos). Mobile devices usually have cameras, which allow for easy capture of images at any location that the user may be. In this context, the images captured by users can be regarding some topic or interest or entity. As described above in regard to FIG. 10J, a user can capture a picture that relates to a specific entity. The user can associate the images captured to specific media forums, such as be sharing the media forum. In one embodiment, the images taken can include metadata regarding the image, such as location of where the picture is taken, tags added by users, comments supplied by users, etc. This additional information can include the definition of various entities.

In the example of FIG. 10J, the picture relates to the entities "Vikings" "training camp" "Adrian Peterson" "summer" "workout" "weather" "location", "geo-location" "comments" etc. The data can be provided by the user who takes the image or by friends or social connections of the user or in the media forum itself. As can be appreciated, the entities associated with the contributed picture can grow over time, as users associate comments, tags, or content to the image. In one embodiment, the content provided via a mobile device to a media forum can include messages with images, such as tweets provided by a Twitter Inc. service.

In one implementation, the content that is uploaded or associated or shared with the media forum can include a number of entities, and those entities can be scored for prominence, similar to the way entities in articles are scored for prominence. Thus, content that is provided to a media forum via a mobile device can be added in the form of a comment and/or new discussion. The discussion or comments provide by mobile postings or association can then be associated to other mobile postings or articles. In this manner, the content to which media forums are associated can include content that is generated via mobile devices, as well as to articles or content produced and displayed on websites.

In one embodiment, data received from a mobile device can include receiving a picture or image (e.g., taken by a camera of a mobile device or image stored in the mobile device), or receiving a text or data, or receiving a combination of images and text, or receiving a character limited message (e.g., Twitter tweets), or receiving a character limited message with an image, or combinations thereof. The content capable of being captured, stored, shared, exchanged, posted, commented on, or discussed when originating from mobile devices can be expansive. Therefore, the examples provided above should not be considered limited, but indeed, just examples.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While in some embodiments, the aforementioned hardware is included within the form factor of a singular device, in other embodiments such hardware may be defined by two or more devices that are connected to each other. It should be appreciated that various communication interfaces between such devices may include various digital or analog connections, including component video/audio, coaxial, USB, HDMI, Cat5/6, Toslink, XLR, RCA, BNC, etc. In some embodiments, such devices may be wirelessly connected to each other, employing any of various wireless communication technologies, such as IEEE 802.11, IR, Bluetooth, etc.

Figure 11:
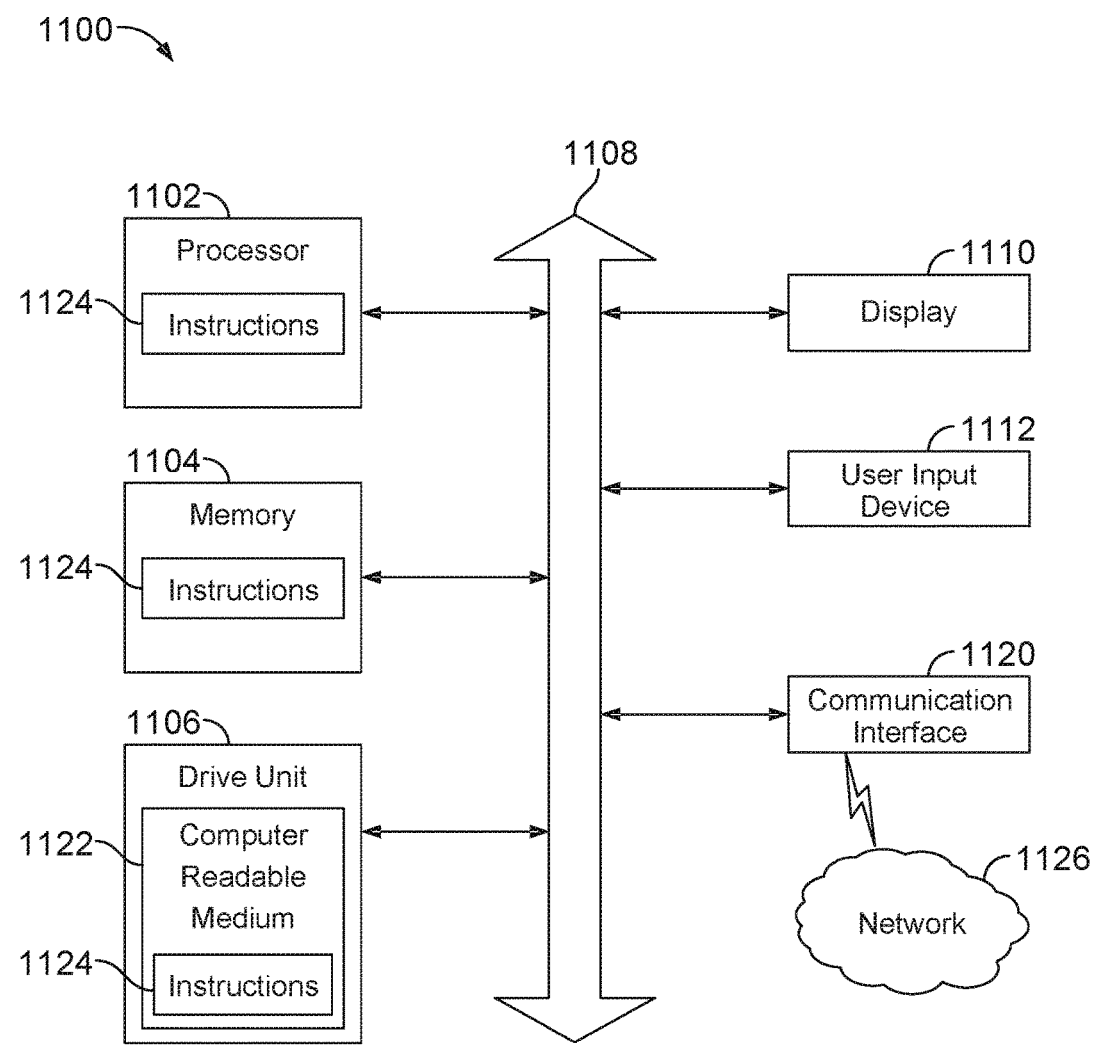
FIG. 11 illustrates an embodiment of a general computer system, processing, and operations, in accordance with some embodiment of the invention.

FIG. 11 illustrates an embodiment of a general computer system designated 1100. The computer system 1100 can include a set of instructions that can be executed to cause the computer system 1100 to perform any one or more of the methods or computer based functions disclosed herein. The computer system 1100 may operate as a standalone device or may be connected, e.g., using a network, to other computer systems or peripheral devices.

In a networked deployment, the computer system 1100 may operate in the capacity of a server or as a client user computer in a server-client user network environment, or as a peer computer system in a peer-to-peer (or distributed) network environment. The computer system 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

As illustrated in FIG. 11, the computer system 1100 may include a processor 1102, e.g., a central processing unit (CPU), a graphics processing unit (GPU), or both. The processor 1102 may be a component in a variety of systems. For example, the processor 1102 may be part of a standard personal computer or a workstation. The processor 1102 may be one or more general processors, digital signal processors, application specific integrated circuits, field programmable gate arrays, servers, networks, digital circuits, analog circuits, combinations thereof, or other now known or later developed devices for analyzing and processing data. The processor 1102 may implement a software program, such as code generated manually (i.e., programmed).

The computer system 1100 may include a memory 1104 that can communicate via a bus 1108. The memory 1104 may be a main memory, a static memory, or a dynamic memory. The memory 1104 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 1104 includes a cache or random access memory for the processor 1102. In alternative embodiments, the memory 1104 is separate from the processor 1102, such as a cache memory of a processor, the system memory, or other memory. The memory 1104 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1104 is operable to store instructions executable by the processor 1102. The functions, acts or tasks illustrated in the figures or described herein may be performed by the programmed processor 1102 executing the instructions stored in the memory 1104. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 1100 may further include a display unit 1110, such as a liquid crystal display (LCD), an organic light emitting diode (OLED), a flat panel display, a solid state display, a cathode ray tube (CRT), a projector, a printer or other now known or later developed display device for outputting determined information. The display 1110 may act as an interface for the user to see the functioning of the processor 1102, or specifically as an interface with the software stored in the memory 1104 or in the drive unit 1116.

Additionally or alternatively, the computer system 1100 may include an input device 1112 configured to allow a user to interact with any of the components of system 1100. The input device 1112 may be a number pad, a keyboard, or a cursor control device, such as a mouse, or a joystick, touch screen display, remote control or any other device operative to interact with the computer system 1100.

The computer system 1100 may also or alternatively include a disk or optical drive unit 1116. The disk drive unit 1116 may include a computer-readable medium 1122 in which one or more sets of instructions 1124, e.g. software, can be embedded. Further, the instructions 1124 may embody one or more of the methods or logic as described herein. The instructions 1124 may reside completely or partially within the memory 1104 and/or within the processor 1102 during execution by the computer system 1100. The memory 1104 and the processor 1102 also may include computer-readable media as discussed above.

In some systems, a computer-readable medium 1122 includes instructions 1124 or receives and executes instructions 1124 responsive to a propagated signal so that a device connected to a network 1126 can communicate voice, video, audio, images or any other data over the network 1126. Further, the instructions 1124 may be transmitted or received over the network 1126 via a communication port or interface 1120, and/or using a bus 1108. The communication port or interface 1120 may be a part of the processor 1102 or may be a separate component. The communication port 1120 may be created in software or may be a physical connection in hardware. The communication port 1120 may be configured to connect with a network 1126, external media, the display 1110, or any other components in system 1100, or combinations thereof. The connection with the network 1126 may be a physical connection, such as a wired Ethernet connection or may be established wirelessly as discussed below. Likewise, the additional connections with other components of the system 1100 may be physical connections or may be established wirelessly. The network 1126 may alternatively be directly connected to the bus 1108.

While the computer-readable medium 1122 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The computer-readable medium 1122 may be non-transitory, and may be tangible.

The computer-readable medium 1122 can include a solid-state memory such as a memory card or other package that houses one or more non-volatile read-only memories. The computer-readable medium 1122 can be a random access memory or other volatile re-writable memory. Additionally or alternatively, the computer-readable medium 1122 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 1100 may be connected to one or more networks 1126. The network 1126 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 1126 may include wide area networks (WAN), such as the Internet, local area networks (LAN), campus area networks, metropolitan area networks, a direct connection such as through a Universal Serial Bus (USB) port, or any other networks that may allow for data communication. The network 1126 may be configured to couple one computing device to another computing device to enable communication of data between the devices. The network 1126 may generally be enabled to employ any form of machine-readable media for communicating information from one device to another. The network 1126 may include communication methods by which information may travel between computing devices. The network 1126 may be divided into sub-networks. The sub-networks may allow access to all of the other components connected thereto or the sub-networks may restrict access between the components. The network 1126 may be regarded as a public or private network connection and may include, for example, a virtual private network or an encryption or other security mechanism employed over the public Internet, or the like.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A method, comprising:
receiving selection of an article for rendering on a webpage of a website, content for the article being provided by a content source, the selection received from a user;
processing the article to identify one or more entities contained within the content, each of the one or more entities being assigned a prominence score based on pre-defined rules for scoring;
examining interest graphs of different media forums related to the one or more entities identified in the article, wherein each of the different media forums includes discussion threads related to the one or more entities, the interest graphs associated with the different media forums dynamically changing over time, based on user interactions received from users during association of the different media forums to the article, wherein changes to the interest graphs dynamically adjusting the prominence score of the one or more entities;
selecting a media forum from the different media forums to associate with the article, the media forum selected based on prominence scores of the one or more entities identified in the article and membership of the user to the media forum; and
presenting the media forum with the article on the webpage, in response to the selection of the article, wherein operations of the method are performed by a processor.

2. The method of claim 1, wherein the prominence score assigned to each entity inherits one or more prominence scores from other articles to which the media forum is associated.

3. The method of claim 1, wherein the user interactions are received from the users while the different media forums are associated with the article.

4. The method of claim 1, wherein the user interactions are received from the users while the different media forums are associated with different articles.

5. The method of claim 1, wherein the user interactions received from the users include user generated content or user comments to define new discussion threads, user comments in relation to existing discussion threads, or user feedback in response to comments or postings of other users in the existing discussion threads, or additional content or links to additional content provided by one or more content sources or any combinations thereof.

6. The method of claim 1, wherein the discussion threads are originated during the association of the media forum to the article.

7. The method of claim 1, wherein each of the discussion threads includes an indicator that is indicative of an origin of the corresponding discussion thread, wherein the origin is within the article when the media forum is associated with the article or is within a different article when the media forum was associated with the different article.

8. The method of claim 7, further including providing a notification in a particular discussion thread within the article when the particular discussion thread receives user interaction in relation to the different article.

9. The method of claim 1, further including updating feedback posted in a discussion thread in the media forum of the article, for an entity posted in the media forum of the article to media forums related to different articles that include the entity.

10. The method of claim 1, further including providing an option to associate a different media forum to the article, wherein the different media forum is contextually related to the one or more entities of the article.

11. The method of claim 1, wherein when more than one media forum is identified for association with the article, prioritizing the identified media forums based on membership of the user to the identified media forums to select a specific one of the identified media forums for association with the article.

12. A non-transitory computer readable storage medium having program instructions, which when executed on a processor performs a method, comprising:
program instructions for receiving selection of an article for rendering on a webpage of a website, content for the article being provided by a content source, the section received from a user;
program instructions for processing the article to identify one or more entities contained within the content, each of the one or more entities being assigned a prominence score based on pre-defined rules for scoring;
program instructions for examining interest graphs of different media forums related to the one or more entities identified in the article, wherein each of the different media forums includes discussion threads related to the one or more entities, the interest graphs associated with the different media forums dynamically changing over time, based on user interactions received from users during association of the different media forums to the article, wherein changes to the interest graphs dynamically adjusting the prominence score of the one or more entities;
program instructions for selecting a media forum from the different media forums to associate with the article, the media forum selected based on prominence scores of the one or more entities identified in the article and membership of the user to the media forum; and
program instructions for presenting the media forum with the article on the webpage, in response to the selection of the article.

13. The computer readable storage medium of claim 12, wherein each of the discussion threads includes an indicator that is indicative of an origin of the corresponding discussion thread, wherein the origin is from within the article when the media forum is associated with the article or is from within a different article when the media forum was associated with the different article.

14. The computer readable storage medium of claim 13, further including program instructions for providing a notification in a particular discussion thread within the article when the particular discussion thread receives user interaction in relation to the different article.

15. The computer readable storage medium of claim 13, further including program instructions for updating feedback posted in a discussion thread in the media forum of the article, for at least one entity posted in the media forum of the article, for an entity in the article, to media forums related to different articles that include the entity.

16. The computer readable storage medium of claim 12, further including program instructions for providing an option to associate a different media forum to the article, wherein the different media forum is contextually related to the one or more entities of the article.

17. The computer readable storage medium of claim 12, further including program instructions for prioritizing identified media forums, based on membership of the user to the identified media forums, so as to select a specific one of the identified media forums for association with the article, when more than one media forum is identified for association with the article.

* * * * *